United States Patent
Kobayashi

(10) Patent No.: US 10,756,562 B2
(45) Date of Patent: Aug. 25, 2020

(54) COMMUNICATION DEVICE, CONTROL PROGRAM, AND NON CONTACT POWER-SUPPLY SYSTEM

(71) Applicant: SHARP KABUSHIKI KAISHA, Sakai, Osaka (JP)

(72) Inventor: Hirokazu Kobayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/300,656

(22) PCT Filed: Aug. 4, 2017

(86) PCT No.: PCT/JP2017/028407
§ 371 (c)(1),
(2) Date: Nov. 12, 2018

(87) PCT Pub. No.: WO2018/025994
PCT Pub. Date: Feb. 8, 2018

(65) Prior Publication Data
US 2019/0148970 A1    May 16, 2019

(30) Foreign Application Priority Data
Aug. 5, 2016    (JP) .................... 2016-154856

(51) Int. Cl.
*H02P 7/00*        (2016.01)
*H02J 7/02*        (2016.01)
*H04B 5/02*        (2006.01)
*H02J 50/10*       (2016.01)
*H02J 50/80*       (2016.01)
*H04B 5/00*        (2006.01)
*H04W 4/80*        (2018.01)

(52) U.S. Cl.
CPC .............. *H02J 7/025* (2013.01); *H02J 50/10* (2016.02); *H02J 50/80* (2016.02); *H04B 5/0031* (2013.01); *H04B 5/0037* (2013.01); *H04B 5/02* (2013.01); *H04W 4/80* (2018.02)

(58) Field of Classification Search
CPC ....................................... H02J 7/025
USPC ....................................... 320/108
See application file for complete search history.

(56) References Cited

U.S. PATENT DOCUMENTS 5,455,466 A * 10/1995 Parks ...................... H02J 7/025
                                                             307/104
6,028,413 A *  2/2000 Brockmann ............ H02J 7/025
                                                             320/108
(Continued)

FOREIGN PATENT DOCUMENTS

JP   2014-033504 A    2/2014
JP   2014-193031 A   10/2014
(Continued)

*Primary Examiner* — Yalkew Fantu
(74) *Attorney, Agent, or Firm* — ScienBiziP, P.C.

(57) ABSTRACT

A communication device includes: a short-range wireless communication unit that performs short-range wireless communication; a communication unit that receives power transmission information about power transmission transmitted from a power transmission device that transmits power in a non-contact manner; and a control unit that controls power application to the short-range wireless communication unit in a case that the communication unit has received the power transmission information.

11 Claims, 6 Drawing Sheets

(56) References Cited

U.S. PATENT DOCUMENTS

| | | | |
|---|---|---|---|
| 6,124,700 A * | 9/2000 | Nagai | H02J 7/0052 |
| | | | 320/132 |
| 2009/0140691 A1 * | 6/2009 | Jung | H02J 7/0027 |
| | | | 320/108 |
| 2010/0225173 A1 * | 9/2010 | Aoyama | H02J 5/005 |
| | | | 307/104 |
| 2014/0035521 A1 | 2/2014 | Endo | |
| 2017/0181087 A1 | 6/2017 | Kato et al. | |

FOREIGN PATENT DOCUMENTS

| | | | |
|---|---|---|---|
| JP | 2014-217154 A | | 11/2014 |
| JP | 2017-112706 | * | 12/2015 |
| JP | 2016-034169 A | | 3/2016 |
| JP | 2017-112706 A | | 6/2017 |

* cited by examiner

COMMUNICATION DEVICE, CONTROL PROGRAM, AND NON CONTACT POWER-SUPPLY SYSTEM

TECHNICAL FIELD

Some aspects of the present invention relate to a communication device, a control program, and a non-contact power-supply system.

Priority is claimed on Japanese Patent Application No. 2016-154856, filed Aug. 5, 2016, the content of which is incorporated herein by reference.

BACKGROUND ART

Conventionally, non-contact power-supply systems configured to include a wireless power transmission device (a power transmission device) that performs power transmission (power supply) in a non-contact (wireless) manner and a communication device (a power reception device) such as a terminal device that receives and uses electric power transmitted from the wireless power transmission device have been put into practical use. Also, in recent years, terminal devices constituting non-contact power-supply systems have become multifunctional and terminal devices having a function of short-range wireless communication based on near field radio communication (NFC) or the like have been put into practical use.

Meanwhile, an NFC circuit provided in the above-described terminal device transmits power with radio waves having the same frequency as those to be used in a case that the wireless power transmission device performs the wireless power transmission or radio waves of a multiplied frequency. In general, a wireless power transmission circuit uses radio waves having significantly higher power than those used by the NFC circuit for communication to transmit power. Thus, in a terminal device (an electronic device) equipped with a function of receiving power of wireless power transmission and an NFC-based communication function, in a case that power transmission (power supply) based on wireless power transmission is performed in a case that NFC-based communication is performed, destruction of the NFC circuit due to radio waves for transmitting power occurs.

Therefore, for example, as in Patent Document 1, technology for enabling an operation of a communication circuit during a period of charging based on wireless power supply of a cell (a secondary cell) mounted on a power-reception-side communication device and further preventing a communication circuit from being destructed during a period in which the secondary cell is being charged has been proposed. In the technology disclosed in Patent Document 1, if a voltage detection circuit provided in a power reception unit of the power-reception-side communication device has detected a charging voltage (a transmission voltage) exceeding a predetermined threshold during a period in which the secondary cell is being charged, power application to the NFC circuit is blocked. Thereby, in the technology disclosed in Patent Document 1, destruction of the NFC circuit during a period in which charging is being performed through wireless power supply is prevented.

PRIOR ART DOCUMENT

Patent Document

[Patent Document 1] Japanese Unexamined Patent Application, First Publication No. 2014-033504

SUMMARY OF THE INVENTION

Problem to be Solved by the Invention

Generally, in a non-contact power-supply system that performs wireless power transmission, a wireless power transmission device (a power transmission device) initially transmits weak power and communicates with a communication device such as a terminal device that receives and uses the transmitted power, i.e., a communication device to be charged with the power transmitted from the power transmission device. Then, the power transmission device starts power transmission of strong power after checking that the communication device is ready for receiving power through communication with the communication device. In this manner, in the non-contact power-supply system that performs the wireless power transmission, the power transmission device does not transmit strong power to a communication device (a power reception device) from the beginning. Thus, normally, in the non-contact power-supply system, there is no situation in which the power transmitted by the power transmission device to the communication device (the power reception device), i.e., a charging voltage in the communication device rapidly increases.

However, the power transmission device constituting the non-contact power-supply system may have a function (capability) of simultaneously transmitting power to a plurality of communication devices (power reception devices). In this case, in a case that another communication device (a power reception device) enters a range of radio waves for performing wireless power transmission while the power transmission device is transmitting power to the communication device (the power reception device), power transmission, the power transmission device transmits strong power with which power transmission has already been performed to another communication device. That is, strong power transmission can be performed with respect to the communication device from the beginning. In this case, in the communication device to which strong power is transmitted from the beginning, the charging voltage rapidly increases.

In the technology disclosed in Patent Document 1, as described above, there is technology for blocking power application to an NFC circuit in a case that a voltage detection circuit provided in the power reception unit of the power-reception-side communication device has detected a charging voltage (a power transmission voltage) exceeding a predetermined threshold during the charging period. Thus, according to the technology disclosed in Patent Document 1, if the charging voltage has rapidly increased, a process of blocking power application to the NFC circuit is not performed in time and therefore there is a risk of destruction of the NFC circuit.

Some aspects of the present invention have been made based on the above-described problems and an objective of the present invention is to provide a communication device, a control program, and a non-contact power-supply system capable of avoiding a risk of destruction of a short-range wireless communication circuit provided in a communication device in a case that a secondary cell is charged with power transmitted through wireless power transmission.

Means for Solving the Problems

To solve the above-described problem, a communication device according to one aspect of the present invention includes a short-range wireless communication unit that performs short-range wireless communication; a communication unit that receives power transmission information about power transmission transmitted from a power transmission device that transmits power in a non-contact manner; and a control unit that controls power application to the short-range wireless communication unit in a case that the communication unit has received the power transmission information.

In addition, in the above-described communication device, one aspect of the present invention may be the communication device further including: a power reception unit that receives the power transmitted from the power transmission device; and a secondary cell, wherein the control unit controls charging of the secondary cell with the power received by the power reception unit.

In addition, in the above-described communication device, one aspect of the present invention may be the communication device wherein the control unit blocks the power application from the power reception unit to the short-range wireless communication unit in a case that the communication unit has received the power transmission information.

In addition, in the above-described communication device, one aspect of the present invention may be the communication device further including: a second power reception unit to be used in a case that the short-range wireless communication unit performs the short-range wireless communication, wherein the control unit blocks the power application from the second power reception unit to the short-range wireless communication unit in a case that the communication unit has received the power transmission information.

In addition, in the above-described communication device, one aspect of the present invention may be the communication device, wherein the control unit blocks the power application to the short-range wireless communication unit in a case that the power transmission information indicates that the power is being transmitted.

In addition, in the above-described communication device, one aspect of the present invention may be the communication device, wherein the control unit performs control in a state in which the power application to the short-range wireless communication unit is not blocked in a case that the power transmission information indicates that the power is not being transmitted.

In addition, in the above-described communication device, one aspect of the present invention may be the communication device, wherein the control unit performs control in a state in which the power application to the short-range wireless communication unit is not blocked in a case that a state in which the communication unit does not receive the power transmission information has been reached.

In addition, in the above-described communication device, one aspect of the present invention may be the communication device, wherein the control unit blocks the power application to the short-range wireless communication unit in a case that the communication device is present in a power transmission range in which the power transmission device is able to transmit the power.

In addition, in the above-described communication device, one aspect of the present invention may be the communication device, wherein the control unit blocks the power application to the short-range wireless communication unit in a case that a magnitude of the power transmitted by the power transmission device is greater than or equal to a predetermined magnitude.

In addition, in the above-described communication device, one aspect of the present invention may be the communication device, wherein the control unit performs control in a state in which the power application to the short-range wireless communication unit is not blocked in a case that a magnitude of the power transmitted by the power transmission device is less than or equal to a predetermined magnitude.

In addition, in the above-described communication device, one aspect of the present invention may be the communication device, wherein the communication device further includes: a connection blocking unit that blocks an electrical connection of a path along which the power is supplied to the short-range wireless communication unit, wherein the control unit performs control in a state in which the power application to the short-range wireless communication unit is blocked by controlling the connection blocking unit in an open state, and wherein the control unit performs control in a state in which the power application to the short-range wireless communication unit is not blocked by controlling the connection blocking unit in a closed state.

In addition, a control program, of one aspect of the present invention, for causing a computer to function as a control unit of a communication device including a short-range wireless communication unit that performs short-range wireless communication, a communication unit that receives power transmission information about power transmission transmitted from a power transmission device that transmits power in a non-contact manner, and the control unit, wherein the control program causes the computer to function as the control unit that controls power application to the short-range wireless communication unit in a case that the communication unit has received the power transmission information.

In addition, a non-contact power-supply system according to one aspect of the present invention, includes: a power transmission device including a first communication unit having a communication distance that is longer than a power transmission range in which power is able to be transmitted in a non-contact manner and that transmits power transmission information about power transmission through the first communication unit; and a communication device including a short-range wireless communication unit that performs short-range wireless communication, a second communication unit that receives the power transmission information transmitted from the power transmission device, and a control unit that controls power application to the short-range wireless communication unit in a case that the second communication unit has received the power transmission information.

Effect of the Invention

According to some aspects of the present invention, it is possible to provide a communication device, a control program, and a non-contact power-supply system capable of avoiding a risk of destruction of a short-range wireless communication circuit provided in a communication device in a case that a secondary cell is charged with power transmitted through wireless power transmission.

EMBODIMENTS FOR CARRYING OUT THE INVENTION

First Embodiment

Figure 1:
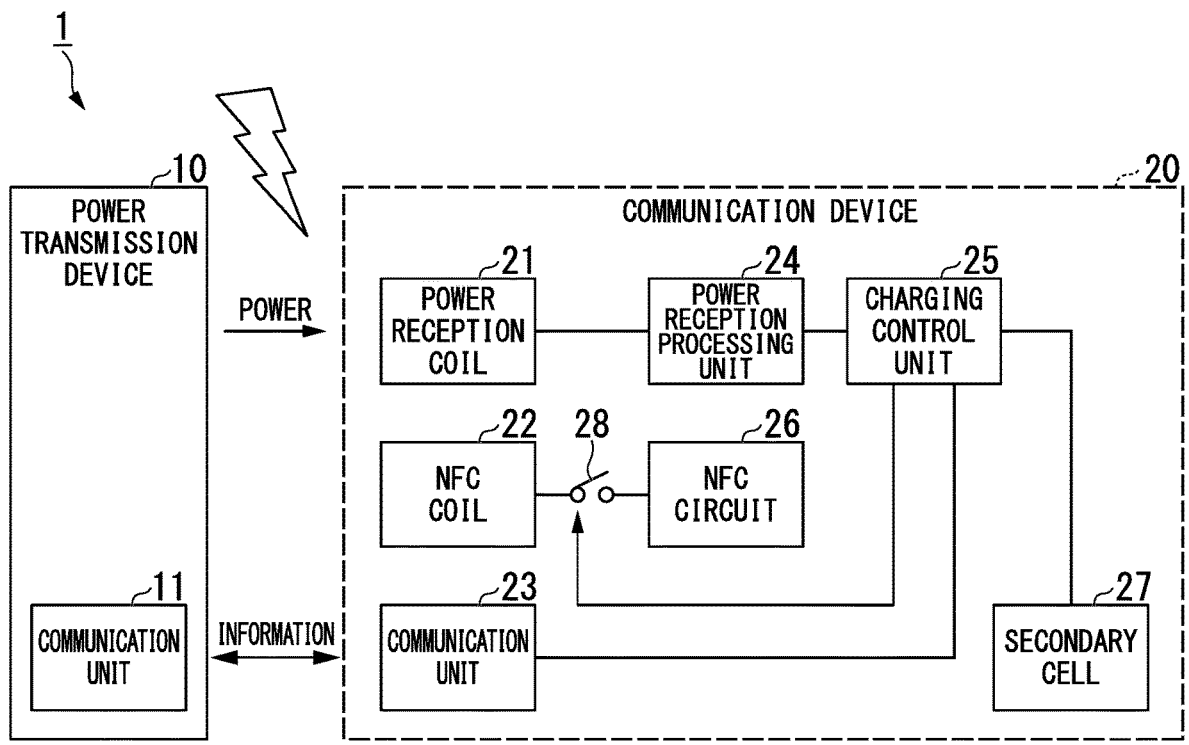
FIG. 1 is a block diagram illustrating a schematic configuration of a non-contact power-supply system according to a first embodiment of the present invention.

Hereinafter, a first embodiment of the present invention will be described with reference to the drawings. FIG. 1 is a block diagram illustrating a schematic configuration of a non-contact power-supply system according to the first embodiment of the present invention. The non-contact power-supply system 1 of the first embodiment illustrated in FIG. 1 is configured to include a power transmission device 10 and a communication device 20. In FIG. 1, a state in which power transmitted from the power transmission device 10 constituting the non-contact power-supply system 1 is received by the communication device 20 constituting the non-contact power-supply system 1, i.e., a power reception device, is illustrated.

The power transmission device 10 is a wireless power transmission device configured to transmit power in a non-contact (wireless) manner (wireless power transmission). More specifically, the power transmission device 10 causes a magnetic field having an intensity varying with AC power to be generated by a power transmission coil (not illustrated) and transmits power as electromagnetic waves to the communication device 20 present in the vicinity thereof, i.e., the communication device 20 present within the magnetic field generated by the power transmission coil (not illustrated). The power transmission device 10 has a function (capability) of simultaneously transmitting power to a plurality of communication devices or power reception devices including the communication device 20. For example, the power transmission device 10 may be configured as a charger, a charging adapter, a charging pad, or the like that transmits power to a terminal device using received power. Also, in an aspect of the present invention, a form in which the power transmission device 10 is configured is not particularly specified.

The power transmission device 10 is configured to include a communication unit 11. The communication unit 11 is a communication interface configured to transmit and receive information through wireless communication. The communication unit 11 exchanges information indicating whether or not the power transmission device 10 is transmitting power, i.e., information indicating whether or not a magnetic field for transmitting power is being generated by the power transmission coil (not illustrated), with the communication device 20 through wireless communication. Also, the communication unit 11 may use a communication antenna (not illustrated) as an antenna for transmitting a radio signal in a case that wireless communication with the communication device 20 is performed or may use the power transmission coil (not illustrated) provided in the power transmission device 10 as an antenna.

Here, a communication standard in a case that the communication unit 11 performs wireless communication is a communication standard in which a range in which the power transmission device 10 can transmit power through wireless power transmission, i.e., an arrival distance (a communication distance) of a radio signal for performing wireless communication, is longer than a longest distance from the communication device 20 to which the power transmission device 10 can transmit power. More specifically, the communication standard in a case that the communication unit 11 performs wireless communication is, for example, a short-range wireless communication standard such as Bluetooth (registered trademark) or a wireless communication standard using a wireless local area network (LAN) such as Wireless Fidelity (WiFi) (registered trademark). Also, in an aspect of the present invention, a configuration and a control method for enabling the communication unit 11 to wirelessly communicate with the communication device 20 and a standard or a communication method for the wireless communication are not particularly specified.

The communication device 20 receives power transmitted from the power transmission device 10. The communication device 20 charges the secondary cell with the received power. Also, the communication device 20 wirelessly communicates with the power transmission device 10 by using the received power or the power with which the secondary cell is charged. Also, the communication device 20 performs short-range wireless communication with a near field radio communication (NFC) communication device (not illustrated) by using the received power or the power with which the secondary cell is charged. That is, the communication device 20 has a function of wireless communication (for example, short-range wireless communication such as Bluetooth (registered trademark)) and a function of short-range wireless communication (NFC communication).

Also, the communication device 20 may be configured as a part of a terminal device configured to implement various functions using the received power. For example, the communication device 20 may be provided in a personal computer (PC), a portable phone using an existing mobile communication network, a portable communication terminal (a so-called smartphone) in which functions of a portable phone and a portable information terminal (PDA: Personal Digital Assistant) are combined, a tablet terminal, or the like.

The communication device 20 is configured to include a power reception coil 21, an NFC coil 22, a communication unit 23, a power reception processing unit 24, a charging control unit 25, an NFC circuit 26, a secondary cell 27, and a switch 28.

The power reception coil 21 is a power reception unit configured to receive power transmitted from the power transmission device 10. More specifically, in a case that the communication device 20 is close to the power transmission device 10, i.e., the communication device 20 enters the magnetic field generated by the power transmission coil (not illustrated) in the power transmission device 10, a magnetic field having an intensity varying with power transmitted as electromagnetic waves by the power transmission device 10 is generated in the power reception coil 21 and an induced current according to electromagnetic induction due to a change in the intensity of the generated magnetic field is generated. The power reception coil 21 receives the generated induced current as power transmitted by the power transmission device 10. The power reception coil 21 supplies the received power to the power reception processing unit 24. Also, in the power reception coil 21, a resonance circuit is configured by connecting resonance capacitors (not illustrated) in parallel and power generated at both ends of the resonance capacitor (not illustrated) is supplied as the received power to the power reception processing unit 24.

The power received by the power reception coil 21 is used for charging the secondary cell 27. Also, if the communication device 20 is configured as a part of a terminal device for implementing various functions with the received power, the power received by the power reception coil 21 is used as a power source of a functional unit configured to implement various functions provided in the terminal device. Also, a configuration in which the power with which the secondary cell 27 is charged is used without directly using the power received by the communication device 20 as the power source of the functional unit, i.e., the received power is used after the secondary cell 27 is temporarily charged with the received power, may be adopted.

Similar to the power reception coil 21, the NFC coil 22 is a power reception unit configured to generate an induced current according to an intensity of the magnetic field within which the communication device 20 is present and receive the generated induced current as power. The NFC coil 22 supplies the received power to the NFC circuit 26 via the switch 28. Also, the NFC coil 22 is used as an antenna in a case that the NFC circuit 26 performs NFC communication.

Also, a target magnetic field from which the NFC coil 22 receives power is a magnetic field generated by an NFC communication device (not illustrated). In other words, the target magnetic field from which the NFC coil 22 receives power is a magnetic field using low-power radio waves generated to transmit necessary power in a case that the NFC communication device (not illustrated) performs NFC communication instead of a magnetic field using high-power radio waves generated by the power transmission coil (not illustrated) in the power transmission device 10 to charge the secondary cell 27. However, because the configuration of the NFC coil 22 is also similar to that of the power reception coil 21, the NFC coil 22 also receives power transmitted by the power transmission device 10.

The communication unit 23 is a communication interface configured to perform transmission and reception (wireless communication) of various information and data and the like to and from the communication unit 11 provided in the power transmission device 10 in accordance with control from the charging control unit 25. As described above, the communication unit 23 exchanges information indicating whether or not the power transmission device 10 is transmitting power, i.e., information indicating whether or not a magnetic field for transmitting power is being generated by the power transmission coil (not illustrated), with the communication unit 11 provided in the power transmission device 10 through wireless communication. Also, the communication unit 23 may use a communication antenna (not illustrated) as an antenna for transmitting a radio signal in a case that wireless communication is performed with the communication unit 11 provided in the power transmission device 10 or may use the power reception coil 21 as an antenna.

Here, a communication standard in a case that the communication unit 23 performs wireless communication is the same as a communication standard of the communication unit 11 provided in the power transmission device 10. In other words, the communication standard in a case that the communication unit 23 performs wireless communication is, for example, a short-range wireless communication standard such as Bluetooth (registered trademark) or a wireless communication standard using a wireless local area network (LAN) such as Wireless Fidelity (WiFi) (registered trademark) in which a communication distance is longer than a largest distance from the communication device 20 to which the power transmission device 10 can transmit power. Also, in an aspect of the present invention, a configuration and a control method for enabling the communication unit 23 to wirelessly communicate with the communication unit 11 provided in the power transmission device 10 and a standard or a communication method for the wireless communication are not particularly specified.

The power reception processing unit 24 is a power adjustment unit configured to adjust power supplied from the power reception coil 21, i.e., power transmitted from the power transmission device 10. For example, the power reception processing unit 24 is configured to include a rectification circuit configured to rectify a current in the power supplied from the power reception coil 21 (i.e., an induced current generated in the power reception coil 21) and a constant voltage circuit configured to constantly adjust a voltage in power rectified by the rectification circuit. The power reception processing unit 24 supplies adjusted power, i.e., power rectified to the constant voltage, to the charging control unit 25.

The charging control unit 25 controls power supply and charging for the secondary cell 27 with power supplied from the power reception processing unit 24, i.e., power transmitted from the power transmission device 10 and rectified to a constant voltage. Also, the charging control unit 25 controls the communication unit 23 to exchange information with the power transmission device 10 and controls opening and closing of the switch 28 (an open circuit and a short circuit) based on information exchanged with the power transmission device 10. For example, the charging control unit 25 controls the opening and closing of the switch 28 (the open circuit and the short circuit) during a period in which charging is completed from a start of charging of the secondary cell 27 based on the information exchanged with the power transmission device 10. Also, the charging control unit 25 may be configured to be implemented by, for example, a central processing unit (CPU) or the like executing a control program for performing the above-described control. Also, for example, the charging control unit 25 may be configured so that the above-described control is implemented by an integrated circuit such as dedicated large scale integration (LSI), i.e., a so-called application specific integrated circuit (ASIC).

Here, information to be exchanged with the power transmission device 10 via the communication unit 23 by the charging control unit 25 is information indicating whether or not the power transmission device 10 is transmitting power through wireless power transmission, i.e., whether or not the power transmission device 10 is generating a magnetic field for transmitting power through the power transmission coil (not illustrated). Before charging of the secondary cell 27 starts, i.e., before the communication device 20 enters the magnetic field generated by the power transmission coil (not illustrated) of the power transmission device 10, the charging control unit 25 checks whether or not the power transmission device 10 is generating a magnetic field for transmitting power. That is, the charging control unit 25 checks a power transmission situation of the power transmission device 10 in advance. Then, the charging control unit 25 controls the opening and closing of the switch 28 (the open circuit and the short circuit) based on the checked power transmission situation in the power transmission device 10. This is because, in a case that the power transmission device 10 is transmitting power to another communication device or a power reception device, i.e., in a case that the power transmission device 10 is generating a strong magnetic field through the power transmission coil (not illustrated), it is possible to avoid a risk of destruction of the NFC circuit 26 due to reception of strong power by the NFC coil 22 and supply of power (application of power) received by the NFC circuit 26 via the switch 28 in a case that the communication device 20 is present within a strong magnetic field. Thus, the communication unit 23 performs wireless communication in a wireless communication standard in which a communication distance is longer than a longest distance from the communication device 20 to which the power transmission device 10 can transmit power.

In the following description, information indicating a current situation of whether or not the power transmission device 10 is transmitting power through wireless power transmission to be exchanged between the communication unit 11 provided in the power transmission device 10 and the communication unit 23 (i.e., the charging control unit 25) is referred to as "power transmission information".

In a case that charging of the secondary cell 27 starts, the charging control unit 25 controls the communication unit 23 to request the power transmission device 10 to transmit the power transmission information. For example, the charging control unit 25 causes the communication unit 23 to transmit a power transmission information request signal for requesting the power transmission information to the power transmission device 10. Then, the charging control unit 25 controls the opening and closing of the switch 28 (the open circuit and the short circuit) based on the power transmission information transmitted from the power transmission device 10. For example, if the communication unit 23 receives the power transmission information transmitted by the power transmission device 10 in accordance with the transmitted power transmission information request signal and the received power transmission information is input from the communication unit 23, the charging control unit 25 controls the opening and closing of the switch 28 (the open circuit and the short circuit) based on a current power transmission situation in the power transmission device 10 indicated by the input power transmission information. Also, if a notification indicating that the power transmission information has been received is input from the communication unit 23, the charging control unit 25 controls the communication unit 23 to acquire the power transmission information transmitted from the power transmission device 10 and controls the opening and closing of the switch 28 (the open circuit and the short circuit) based on the acquired power transmission information. More specifically, the charging control unit 25 controls the opening and closing of the switch 28 (the open circuit and the short circuit) so that a risk of destruction of the NFC circuit 26 is avoided. More specifically, the charging control unit 25 controls the switch 28 in the open state (an open-circuit state) to avoid the risk of destruction of the NFC circuit 26. Also, at this time, before the switch 28 is controlled in the open state (the open-circuit state), the charging control unit 25 may perform control so that the NFC circuit 26 is initialized or an operation of the NFC circuit 26 is stopped. Thereafter, the charging control unit 25 supplies the secondary cell 27 with power supplied from the power reception processing unit 24 and charges the secondary cell 27.

Also, in the above description, a configuration in which the power transmission device 10 transmits the power transmission information in accordance with the power transmission information request signal transmitted by controlling the communication unit 23 from the charging control unit 25 has been described. However, a timing at which the power transmission device 10 transmits the power transmission information is not limited to the above-described timing. That is, although a configuration in which wireless communication is performed between the power transmission device 10 and the communication device 20 in a so-called multicast communication scheme has been described in the above description, a scheme of the wireless communication between the power transmission device 10 and the communication device 20 is not limited to the multicast communication scheme. For example, the power transmission device 10 may be configured to periodically continuously transmit the power transmission information through the communication unit 11, i.e., to perform wireless communication in a so-called broadcast communication scheme. In this case, the charging control unit 25 can check the power transmission situation of the power transmission device 10 at all times.

If the power transmission information transmitted from the power transmission device 10 indicates that power is transmitted through wireless power transmission, the charging control unit 25 causes the secondary cell 27 to be charged with power previously transmitted by the power transmission device 10. However, if the power transmission information transmitted from the power transmission device 10 indicates that power is not transmitted through wireless power transmission, the charging control unit 25 requests the power transmission device 10 to transmit power and causes the secondary cell 27 to be charged with power transmitted by the power transmission device 10 in response to the request. More specifically, the charging control unit 25 controls the communication unit 23 to request the power transmission device 10 to transmit power. For example, the charging control unit 25 causes the communication unit 23 to transmit a power transmission request signal for requesting power transmission to the power transmission device 10. Thereafter, the charging control unit 25 starts charging of the secondary cell 27 with power transmitted by the power transmission device 10 accepting the requested power transmission. For example, if the communication unit 23 receives a power transmission acceptance signal indicating that power transmission has been accepted in response to the transmitted power transmission request signal and the received power transmission acceptance signal or a notification indicating that the power transmission acceptance signal has been received is input from the communication unit 23, the charging control unit 25 supplies the secondary cell 27 with power supplied from the power reception processing unit 24 in accordance with power transmitted by the power transmission device 10 and causes the secondary cell 27 to be charged with the supplied power.

Also, if the power transmission acceptance signal or the notification indicating that the power transmission acceptance signal has been received is not input from the communication unit 23 even in a case that a predetermined time has elapsed, for example, the charging control unit 25 determines that requested power transmission of the power transmission device 10 has not been accepted due to a reason for which the power transmission device 10 cannot start power transmission such as the fact that the power transmission device 10 is not present in the vicinity. In this case, the charging control unit 25 waits for the secondary cell 27 to be charged. At this time, the charging control unit 25 may be configured to provide a notification indicating that retransmission of the power transmission request signal by the communication unit 23 or charging of the secondary cell 27 is impossible.

Also, if the communication device 20 is present in a range in which the power transmission device 10 can transmit power through wireless power transmission even after the charging of the secondary cell 27 is completed, the charging control unit 25 checks a power transmission situation in the power transmission device 10 and controls the opening and closing of the switch 28 (the open circuit and the short circuit) based on the checked power transmission situation in the power transmission device 10.

That is, the charging control unit 25 controls the opening and closing of the switch 28 (the open circuit and the short circuit) by checking the power transmission situation of the power transmission device 10 until the communication device 20 exits the range in which the power transmission device 10 can transmit power through wireless power transmission. This is to avoid a risk of destruction of the NFC circuit 26 because the NFC coil 22 also receives strong power in a case that the communication device 20 is present within a strong magnetic field generated by the power transmission coil (not illustrated) in the power transmission device 10. Therefore, in the wireless communication between the communication unit 23 and the communication unit 11 provided in the power transmission device 10, it is desirable to determine a distance between the power transmission device 10 and the communication unit 23 (i.e., the communication device 20), i.e., whether or not the power transmission device 10 is present in a range in which power can be transmitted through wireless power transmission.

Also, the above-described power transmission information request signal or power transmission request signal may include identification information for identifying the communication device 20. In this case, the power transmission device 10 can transmit (return) power transmission information or a power transmission acceptance signal by determining whether or not the communication device 20 transmitting the power transmission information request signal or the power transmission request signal is a target communication device 20 to which power is transmitted. Also, the power transmission request signal may include information indicating a necessary magnitude of power (power level) in a case that the secondary cell 27 is charged (including a voltage value, a current value, and the like). In this case, the power transmission device 10 can transmit (return) the power transmission acceptance signal by determining whether or not it is possible to transmit requested power.

Also, the above-described power transmission information or power transmission acceptance signal may include identification information for identifying the power transmission device 10. In this case, the charging control unit 25 can receive power transmitted from the power transmission device 10 by determining whether or not the communication device 10 transmitting the power transmission information or the power transmission acceptance signal is a target power transmission device 10 for charging the secondary cell 27 with transmitted power.

Also, the power transmission acceptance signal may include information indicating a power level at which power transmission is possible (including a voltage value, a current value, and the like). In this case, the charging control unit 25 can control charging of the secondary cell 27 (e.g., a charging time, a voltage value, a current value during charging, and the like) by determining whether or not power transmitted from the power transmission device 10 can secure a necessary power level in a case that the secondary cell 27 is charged.

Also, the information indicating the power level may be transmitted and received in the information exchange with the power transmission device 10 after the power transmission acceptance signal or the notification indicating that the power transmission acceptance signal has been received is input from the communication unit 23 to the charging control unit 25. For example, after the power transmission acceptance signal or the notification indicating that the power transmission acceptance signal has been received is input from the communication unit 23, the charging control unit 25 may control the communication unit 23 to cause information indicating a necessary power level in a case that the secondary cell 27 is charged to be transmitted to the power transmission device 10. Also, for example, the power transmission device 10 may transmit information indicating a power level at which power transmission can be performed to the communication device 20 subsequently to the transmission of the power transmission acceptance signal according to the received power transmission request signal.

Also, information to be exchanged with the power transmission device 10 by the charging control unit 25 via the communication unit 23 includes information indicating whether or not the charging control unit 25 is performing power supply and charging for the secondary cell 27, i.e., the communication device 20 is charging the secondary cell 27 by receiving power (whether or not the secondary cell 27 is being charged) (hereinafter referred to as "charging information"). In a case that the secondary cell 27 is being charged, the charging control unit 25 transmits the charging information indicating that the secondary cell 27 is being charged to the power transmission device 10. Thereby, the charging control unit 25 can notify the power transmission device 10 that the communication device 20 is charging the secondary cell 27. The charging information transmitted by the charging control unit 25 to the power transmission device 10 can be received by another communication device or a power reception device. That is, the charging control unit 25 can provide a notification indicating that the communication device 20 in which the secondary cell 27 is being charged is present to the power transmission device 10 and another communication device or a power reception device is present in a range in which the power transmission device 10 can transmit power through wireless communication transmission by transmitting the charging information to the power transmission device 10. In contrast, the communication device 20 can know that the other communication device or the power reception device present in the range in which the power transmission device 10 can transmit power through wireless power transmission is performing a charging operation by receiving charging information transmitted to the power transmission device 10 by the other communication device or the power reception device.

Also, in an aspect of the present invention, in the information exchanged with the power transmission device 10 via the communication unit 23 by the charging control unit 25, information other than information indicating a current situation of whether or not the power transmission device 10 is transmitting power through wireless power transmission (power transmission information) and information indicating whether or not the communication device 20 (the charging control unit 25) is charging the secondary cell 27 (charging information) is not particularly specified.

Also, detailed description of the above-described process in a case that the secondary cell 27 is charged in the charging control unit 25 will be described below.

The NFC circuit 26 is a communication interface circuit (a short-range wireless communication circuit) configured to perform NFC communication with the NFC communication device (not illustrated). The NFC circuit 26 operates using power received by the NFC coil 22 and supplied via the switch 28 and performs signal processing in the NFC communication. Also, in an aspect of the present invention, a format or a communication method of information, data, or the like to be transmitted and received in the NFC communication with the NFC communication device (not illustrated) in the NFC circuit 26 and the signal processing are not particularly specified.

The secondary cell 27 is, for example, a rechargeable type cell (battery) such as a lithium-ion secondary cell, a nickel-hydrogen storage cell, or a nickel-cadmium storage cell. In accordance with control from the charging control unit 25, the secondary cell 27 stores power supplied from the charging control unit 25, i.e., power transmitted from the power transmission device 10 and rectified to a constant voltage by the power reception processing unit 24. Charges according to a current in the power supplied from the charging control unit 25 are stored in the secondary cell 27 (the secondary cell 27 is charged). Power with which the secondary cell 27 is charged is supplied as a power source of each component provided in the communication device 20. Also, if the communication device 20 is configured as a part of a terminal device configured to implement various functions using the received power, power with which the secondary cell 27 is charged is used as a power source of a functional unit configured to implement various functions provided in the terminal device. In this case, the secondary cell 27 supplies the power with which charging is performed to each functional unit.

The switch 28 is a connection blocking unit configured to block an electrical connection between the NFC coil 22 and the NFC circuit 26 in accordance with control from the charging control unit 25. The switch 28 blocks an electrical connection of a path (wiring) along which the power received by the NFC coil 22 is supplied to the NFC circuit 26. If the communication device 20 charges the secondary cell 27 with power transmitted from the power transmission device 10, the switch 28 is controlled in the open state (the open-circuit state) by the charging control unit 25. Thereby, even if the electrical connection between the NFC coil 22 and the NFC circuit 26 is blocked and the NFC coil 22 receives strong power for charging the secondary cell 27, it is possible to avoid a risk that the voltage of the NFC circuit 26 will be rapidly increased by the strong power and the NFC circuit 26 will be destructed. Also, in the following description, the open state of the switch 28 (the open-circuit state) is referred to as an "OFF state".

Also, if the communication device 20 performs NFC communication with the NFC communication device (not illustrated), the switch 28 is controlled in the closed state (the short-circuit state) by the charging control unit 25. Thereby, the NFC coil 22 and the NFC circuit 26 are electrically connected and the NFC circuit 26 operates using power received and supplied by the NFC coil 22. In a case that the NFC coil 22 is used as an antenna for performing NFC communication, the NFC circuit 26 can perform signal processing on various information and data and the like in the NFC communication input from the NFC coil 22. Also, in the following description, the closed state of the switch 28 (the short-circuit state) is referred to as an "ON state".

Figure 2:
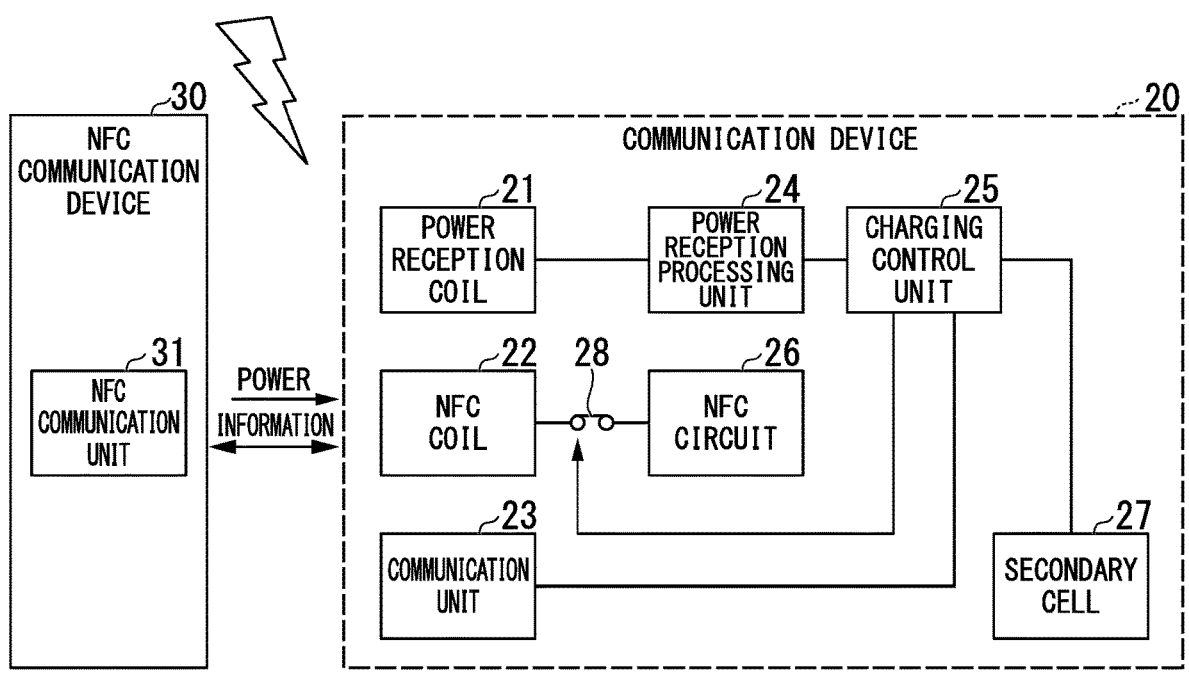
FIG. 2 is a block diagram illustrating a schematic configuration in short-range wireless communication in a communication device constituting the non-contact power-supply system according to the first embodiment of the present invention.

Here, NFC communication in the communication device 20 will be described. FIG. 2 is a block diagram illustrating a schematic configuration in short-range wireless communication (NFC communication) in the communication device 20 constituting the non-contact power-supply system 1 according to the first embodiment of the present invention. In FIG. 2, a state in which the communication device 20 constituting the non-contact power-supply system 1 is performing short-range wireless communication (NFC communication) with an NFC communication device 30 is illustrated. In the following description, an example in which the NFC coil 22 is used as an antenna for performing NFC communication will be described.

The NFC communication device 30 is a communication device configured to transmit necessary power in a case that NFC communication is performed in a non-contact (wireless) manner (wireless power transmission) and transmit and receive various information and data in the NFC communication. As described above, the NFC circuit 26 provided in the communication device 20 performs wireless communication with the NFC communication device 30 by using power transmitted from the NFC communication device 30 and received by the NFC coil 22. Thus, as illustrated in FIG. 2, the charging control unit 25 controls the switch 28 in the OFF state. Thereby, the power received by the NFC coil 22 and various information and data in the NFC communication are transmitted from the NFC coil 22 to the NFC circuit 26 via the switch 28.

The NFC communication device 30 is configured to include an NFC communication unit 31. The NFC communication unit 31 is a communication interface configured to transmit and receive information through the NFC communication. The NFC communication unit 31 transmits/receives various information and data and the like in the NFC communication with the NFC circuit 26 provided in the communication device 20 (short-range wireless communication). Also, the NFC communication unit 31 may use an NFC communication antenna (not illustrated) as an antenna for transmitting a short-range radio signal (an NFC signal) in a case that NFC communication with the communication device 20 is performed or may use a power transmission coil (an NFC power transmission coil) (not illustrated) provided in the NFC communication device 30 as the antenna.

In a case that the communication device 20 approaches, the NFC communication device 30 causes a magnetic field to be formed through the NFC power transmission coil (not illustrated) and transmits power as electromagnetic waves to the communication device 20, i.e., the communication device 20 present within the magnetic field generated by the NFC power transmission coil (not illustrated). Thereby, in the communication device 20, an induced current according to electromagnetic induction caused by the magnetic field formed by the NFC communication device 30 is generated in the NFC coil 22. The NFC coil 22 receives the generated induced current as the power transmitted by the NFC communication device 30 and supplies the power to the NFC circuit 26 via the switch 28. Thereby, the NFC circuit 26 can operate using the power supplied from the NFC coil 22 via the switch 28.

Then, the NFC communication device 30 performs NFC communication with the NFC circuit 26 provided in the communication device 20. In this manner, the NFC communication device 30 transmits power to the approaching communication device 20, and performs NFC communication with the NFC circuit 26 that operates using the transmitted power. Also, in an aspect of the present invention, a configuration and a control method in which the NFC communication device 30 (i.e., the NFC communication unit 31) performs NFC communication with the communication device 20 (i.e., the NFC circuit 26), a format or a communication method of information, data, or the like to be transmitted and received in the NFC communication and signal processing are not particularly specified.

Next, a process in a case that the secondary cell 27 is charged with power transmitted from the power transmission device 10 in the non-contact power-supply system 1 of the first embodiment (hereinafter referred to as a "charging process") will be described.

Figure 3:
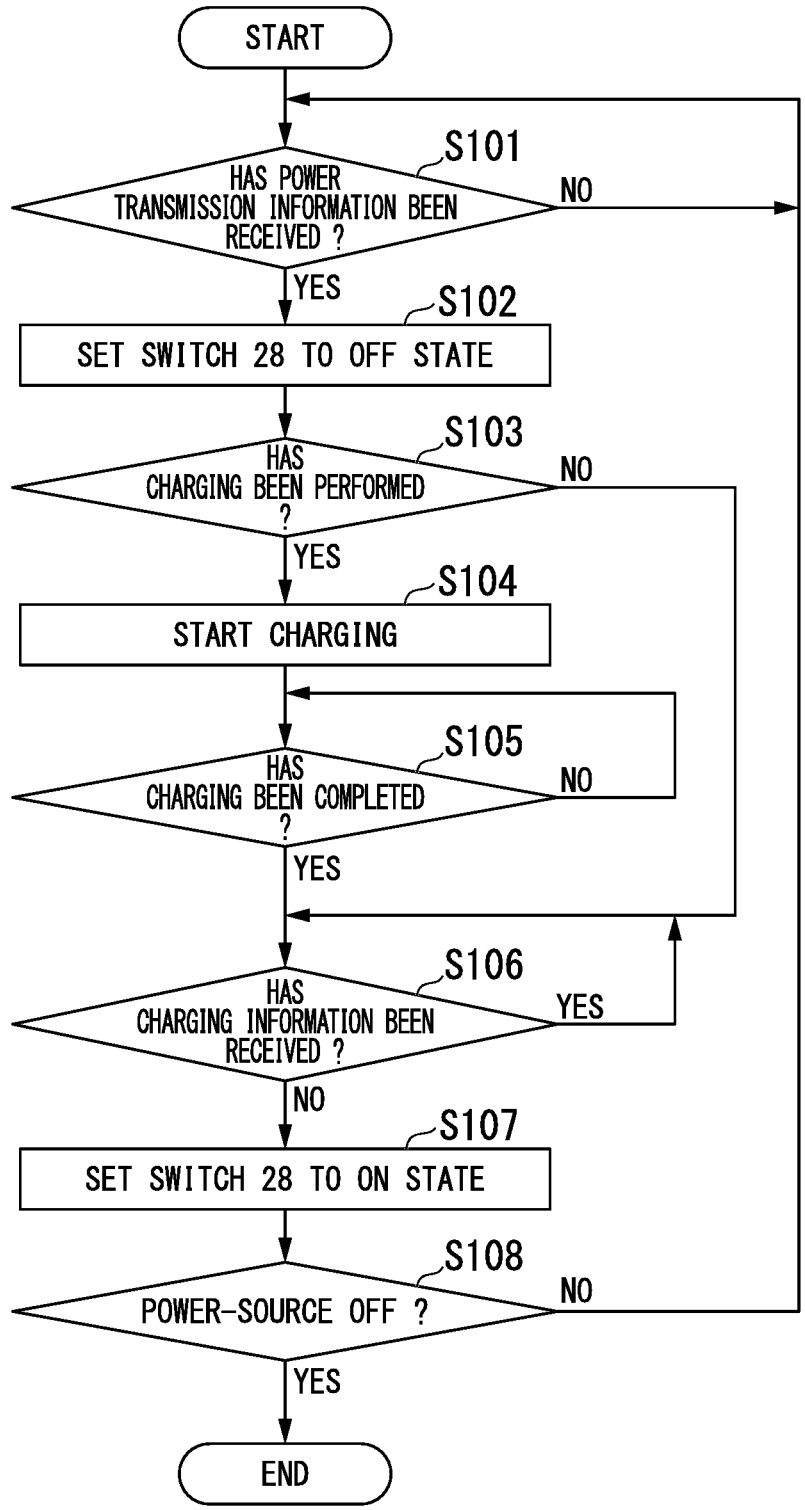
FIG. 3 is a flowchart illustrating a processing procedure in a case that a charging process is performed in the non-contact power-supply system according to the first embodiment of the present invention.

FIG. 3 is a flowchart illustrating a processing procedure in a case that a process of charging (a charging process) is performed in the non-contact power-supply system 1 according to the first embodiment of the present invention. Also, in the following description, an example in which the communication unit 11 provided in the power transmission device 10 and the communication unit 23 provided in the communication device 20 perform short-range wireless communication based on an IEEE 802.15.1 Version 4.0 (BLE: Bluetooth (registered trademark) Low Energy) standard belonging to a Bluetooth (registered trademark) standard (hereinafter referred to as "BLE communication") will be described. Also, in the following description, an example in which the communication unit 11 provided in the power transmission device 10 periodically transmits power transmission information in a broadcast communication scheme of periodically continuously transmitting information will be described.

In a case that the communication device 20 is activated and an operation of charging the secondary cell 27 is not being performed, the charging control unit 25 controls the switch 28 in the ON state. Thereafter, the charging control unit 25 starts the charging process. In the charging process, the charging control unit 25 first controls the communication unit 23 to check whether or not the power transmission information transmitted by the power transmission device 10 through the BLE communication has been received (step S101). More specifically, in step S101, the charging control unit 25 checks whether or not power transmission information indicating that the power transmission device 10 is transmitting power through wireless power transmission has been received.

If a checking result of step S101 indicates that the communication unit 23 has not received the power transmission information transmitted by the power transmission device 10 ("NO" in step S101), the charging control unit 25 maintains the ON state of the switch 28 and returns to step S101 to iterate the checking of whether or not the power transmission information transmitted by the power transmission device 10 has been received in step S101. At this time, the charging control unit 25 may request the power transmission device 10 to transmit power.

On the other hand, if a checking result of step S101 indicates that the communication unit 23 has received the power transmission information transmitted by the power transmission device 10 ("YES" in step S101), the charging control unit 25 controls the switch 28 in the OFF state (step S102). Thereby, it is possible to avoid a risk of destruction of the NFC circuit 26 even if the NFC coil 22 temporarily receives strong power in the communication device 20.

Subsequently, the charging control unit 25 determines whether or not to charge the secondary cell 27 (step S103). In the determination of whether or not to charge the secondary cell 27 in step S103, the charging control unit 25 checks, for example, whether or not a state of charge of the secondary cell 27 is a state of full charge. Then, the charging control unit 25 determines not to charge the secondary cell 27 if the state of charge of the secondary cell 27 is the state of full charge and determines to charge the secondary cell 27 if the state of charge of the secondary cell 27 is not the state of full charge.

Also, in the determination of whether or not to charge the secondary cell 27 in step S103, checking of whether or not the communication device 20 is in a state in which charging of the secondary cell 27 can be performed, for example, checking of whether or not the communication device 20 is present in a range in which the power transmission device 10 can transmit power through wireless power transmission (hereinafter referred to as a "wireless power transmission range"), can also be performed in addition to checking of whether or not the state of charge of the secondary cell 27 is the state of full charge. More specifically, the charging control unit 25 may determine to charge the secondary cell 27 if the communication device 20 is present in the wireless power transmission range of the power transmission device 10 and the state of charge of the secondary cell 27 is not the state of full charge and may determine not to charge the secondary cell 27 if the communication device 20 is not present in the wireless power transmission range of the power transmission device 10 or if the state of charge of the secondary cell 27 is the state of full charge. Also, if the charge state of the secondary cell 27 is not the state of full charge in a case in which the communication device 20 is not present in the wireless power transmission range of the power transmission device 10, it is preferable for the charging control unit 25 to finally determine not to charge the secondary cell 27 in a case that a predetermined period or more has elapsed in a state in which the communication device 20 is not present in the wireless power transmission range of the power transmission device 10. That is, if the communication device 20 is not present in the wireless power transmission range of the power transmission device 10, the charging control unit 25 waits for a final determination to be made during a predetermined period by assuming that the communication device 20 will enter the wireless power transmission range of the power transmission device 10 thereafter without immediately making a final determination indicating that charging of the secondary cell 27 is not performed.

Also, it is possible to determine whether or not the communication device 20 is present in the wireless power transmission range of the power transmission device 10, for example, according to whether or not BLE communication with the power transmission device 10 is being performed. Also, even in a case that the communication device 20 is performing BLE communication with the power transmission device 10, for example, a state in which the communication device 20 is not present in the wireless power transmission range of the power transmission device 10, i.e., a state in which the communication device 20 cannot charge the secondary cell 27, such as the presence of the communication device 20 on the power transmission coil (not illustrated) provided in the power transmission device 10 or at a position deviated from the vicinity thereof is also conceived. In this case, the power transmission device 10 can determine whether or not the communication device 20 is present in the wireless power transmission range based on an amount of change in impedance of the power transmission coil (not illustrated) on the communication device 20 side. For example, if the change in the impedance of the power transmission coil (not illustrated) on the communication device 20 side is small, the power transmission device 10 can determine that the communication device 20 is not present in the wireless power transmission range. Then, the power transmission device 10 can transmit a determination result to the communication device 20 through BLE communication. Thereby, the communication device 20 can determine whether or not the communication device 20 is present in the wireless power transmission range of the power transmission device 10 based on the determination result transmitted from the power transmission device 10 through the BLE communication.

If it is determined that charging of the secondary cell 27 is not performed as a determination result of step S103 ("NO" in step S103), the charging control unit 25 proceeds to step S106.

On the other hand, if it is determined that charging of the secondary cell 27 is performed as a determination result of step S103 ("YES" in step S103), the charging control unit 25 starts charging of the secondary cell 27 (step S104). At this time, the charging control unit 25 controls the communication unit 23 to transmit charging information indicating that charging is in progress to the power transmission device 10 through BLE communication. Thereby, the charging control unit 25 provides a notification indicating that the communication device 20 in which the secondary cell 27 is being charged is present to the power transmission device 10 and another communication device or a power reception device present in the wireless power transmission range of the power transmission device 10.

Subsequently, the charging control unit 25 determines whether or not charging of the secondary cell 27 has been completed (step S105). In the determination of whether or not the charging of the secondary cell 27 has been completed in step S105, the charging control unit 25 checks, for example, whether or not the state of charge of the secondary cell 27 is a state of full charge. The charging control unit 25 determines that the charging of the secondary cell 27 has been completed if the state of charge of the secondary cell 27 is the state of full charge and determines that the charging of the secondary cell 27 has not been completed if the state of charge of the secondary cell 27 is not the state of full charge.

Meanwhile, in the determination of whether or not the charging of the secondary cell 27 has been completed in step S105, checking of whether or not the communication device 20 is in a state in which charging of the secondary cell 27 can be performed, for example, checking of whether or not the communication device 20 is present in the wireless power transmission range of the power transmission device 10, may also be performed in addition to the above-described checking of whether or not the state of charge of the secondary cell 27 is the state of full charge. More specifically, the charging control unit 25 may determine that the charging of the secondary cell 27 has been completed if the communication device 20 is not present in the wireless power transmission range of the power transmission device 10 or if the state of charge of the secondary cell 27 is the state of full charge and may determine that the charging of the secondary cell 27 has not been completed if the communication device 20 is present in the wireless power transmission range of the power transmission device 10 and the state of charge of the secondary cell 27 is not the state of full charge.

If it is determined that charging of the secondary cell 27 has not been completed as a determination result of step S105 ("NO" in step S105), the charging control unit 25 maintains the OFF state of the switch 28 and returns to step S105 to iterate a determination of whether or not charging of the secondary cell 27 has been completed in step S105.

On the other hand, if it is determined that charging of the secondary cell 27 has been completed as a determination result of step S105 ("YES" in step S105), the charging control unit 25 ends charging of the secondary cell 27. After the charging of the secondary cell 27 ends or in a case that it is determined that charging of the secondary cell 27 is not performed as a determination result of step S103 ("NO" in step S103), the charging control unit 25 controls the communication unit 23 to check whether or not charging information transmitted to the power transmission device 10 through the BLE communication by another communication device or a power reception device has been received (step S106).

If a checking result of step S106 indicates that the communication unit 23 has received the charging information transmitted by another communication device or a power reception device ("YES" in step S106), the charging control unit 25 maintains the OFF state of the switch 28 and returns to step S106 to iterate the checking of whether or not the charging information transmitted by another communication device or a power reception device has been received in step S106.

On the other hand, if a checking result of step S106 indicates that the communication unit 23 has not received the charging information transmitted by the other communication device or the power reception device ("NO" in step S106), the charging control unit 25 controls the switch 28 in the ON state after the communication device 20 exits the wireless power transmission range of the power transmission device 10 (step S107). Thereby, a state in which NFC communication by the NFC coil 22 and the NFC circuit 26 can be performed is reached in the communication device 20.

Also, if a checking result of step S106 indicates that the communication device 20 is present in the wireless power transmission range of the power transmission device 10 despite the fact that the communication unit 23 has not received the charging information transmitted by another communication device or a power reception device, the charging control unit 25 may request the power transmission device 10 to terminate power transmission and control the switch 28 in the ON state after power transmission information indicating that the power transmission device 10 is not transmitting power through the wireless power transmission is received.

Subsequently, the charging control unit 25 determines whether or not to stop the operation of the communication device 20, i.e., whether or not to turn off the power source of the communication device 20 (step S108).

If it is determined that the power source of the communication device 20 is not turned off as a determination result of step S108 ("NO" in step S108), the charging control unit 25 returns to step S101 to iterate the charging process.

On the other hand, if it is determined that the power source of the communication device 20 is turned off as a determination result of step S108 ("YES" in step S108), the charging control unit 25 stops the operation of the communication device 20 and terminates the charging process.

According to such a configuration and process, in the non-contact power-supply system 1 of the first embodiment, the power transmission device 10 transmits power transmission information to a communication device 20 existing outside the wireless power transmission range according to a communication standard in which an arrival distance of a radio signal (a communication distance) is longer than the wireless power transmission range (BLE communication in the charging process described with reference to FIG. 3). Thereby, even in a case that the power transmission device 10 has already generated strong power for charging the secondary cell 27 in the non-contact power-supply system 1 of the first embodiment, the communication device 20 (more specifically, the charging control unit 25) can check whether or not the power transmission device 10 is generating strong power in advance based on the received power transmission information. Thereby, in the non-contact power-supply system 1 of the first embodiment, the charging control unit 25 can perform control in a state in which it is possible to avoid a risk of destruction of the NFC circuit 26 (the OFF state of the switch 28) based on a checking result in advance before the communication device 20 enters the wireless power transmission range of the power transmission device 10.

Also, in the non-contact power-supply system 1 of the first embodiment, a configuration in which the NFC circuit 26 operates using power received by the NFC coil 22 and supplied via the switch 28 has been described. However, power used for the operation of the NFC circuit 26 is not limited to the configuration in which the power is received and supplied by the NFC coil 22.

Second Embodiment

Figure 4:
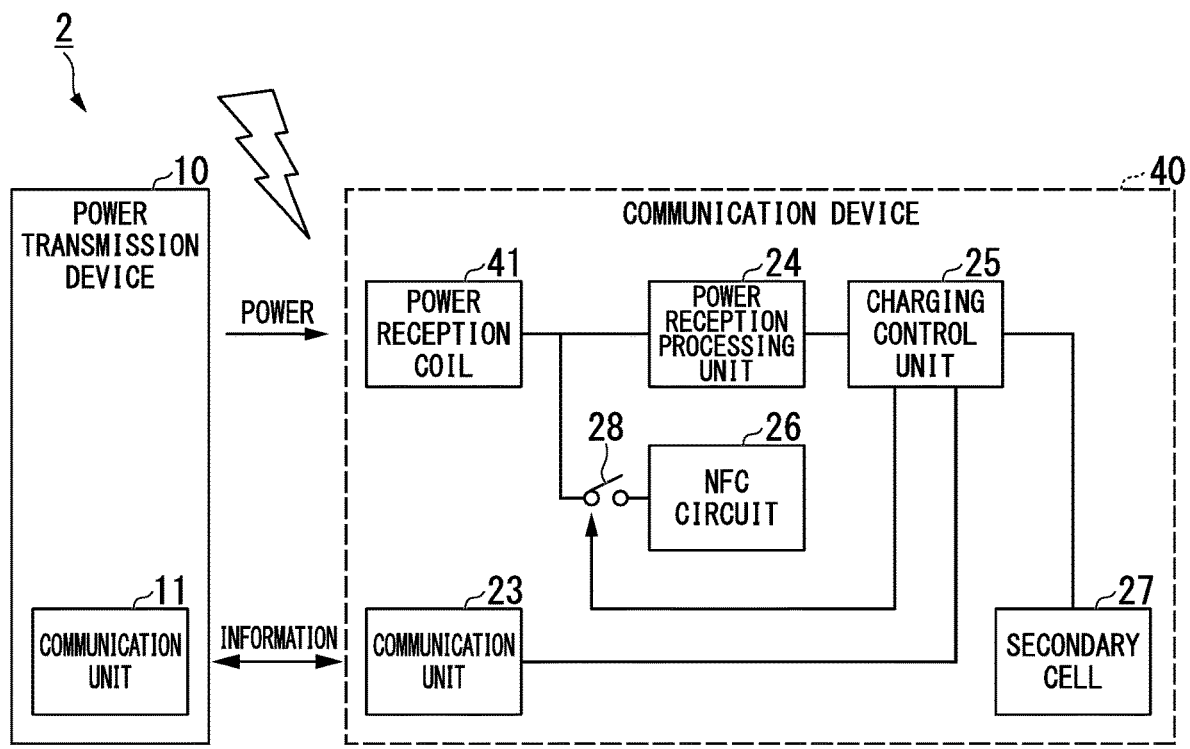
FIG. 4 is a block diagram illustrating a schematic configuration of a non-contact power-supply system according to a second embodiment of the present invention.

Next, a non-contact power-supply system of a second embodiment will be described. FIG. 4 is a block diagram illustrating a schematic configuration of the non-contact power-supply system according to the second embodiment of the present invention. The non-contact power-supply system 2 of the second embodiment illustrated in FIG. 4 is configured to include a power transmission device 10 and a communication device 40. The non-contact power-supply system 2 of the second embodiment illustrated in FIG. 4 has a configuration in which the communication device 20 constituting the non-contact power-supply system 1 of the first embodiment illustrated in FIG. 1 is replaced with the communication device 40.

In FIG. 4, a state in which the power transmitted from the power transmission device 10 constituting the non-contact power-supply system 2 is being received by the communication device 40 constituting the non-contact power-supply system 2 is illustrated. The non-contact power-supply system 2 of the second embodiment is a non-contact power-supply system configured to receive received power transmitted through wireless power transmission from the power transmission device 10 and necessary power in a case that NFC communication is performed transmitted through wireless power transmission from the NFC communication device 30 through the same power reception coil. Also, components of the non-contact power-supply system 2 of the second embodiment illustrated in FIG. 4 also include components similar to those of the non-contact power-supply system 1 of the first embodiment illustrated in FIG. 1. Accordingly, components of the non-contact power-supply system 2 similar to those of the non-contact power-supply system 1 are denoted by the same reference signs for description.

The power transmission device 10 is a power transmission device 10 constituting the non-contact power-supply system 1 of the first embodiment. Accordingly, detailed description of the power transmission device 10 will be omitted.

Similar to the communication device 20 constituting the non-contact power-supply system 1 of the first embodiment, the communication device 40 receives power transmitted from the power transmission device 10 and charges a secondary cell with the received power.

Also, similar to the communication device 20 constituting the non-contact power-supply system 1 of the first embodiment, the communication device 40 uses the received power or the power with which the secondary cell is charged to perform wireless communication with the power transmission device 10. Also, similar to the communication device 20 constituting the non-contact power-supply system 1 of the first embodiment, the communication device 40 uses the received power or the power with which the secondary cell is charged to perform short-range wireless communication with an NFC communication device (not illustrated) (e.g., an NFC communication device 30). Accordingly, similar to the communication device 20 constituting the non-contact power-supply system 1 of the first embodiment, the communication device 40 is also a communication device including a function of wireless communication (e.g., short-range wireless communication such as Bluetooth (registered trademark)) and a function of short-range wireless communication (NFC communication) (also referred to as a power reception device).

Also, similar to the communication device 20 constituting the non-contact power-supply system 1 of the first embodiment, the communication device 40 may be configured as a part of a terminal device configured to implement various functions using received power such as a personal computer (PC), a portable phone, a mobile communication terminal (a so-called smartphone), or a tablet terminal.

The communication device 40 is configured to include a power reception coil 41, an NFC coil 22, a communication unit 23, a power reception processing unit 24, a charging control unit 25, an NFC circuit 26, a secondary cell 27, and a switch 28.

Similar to the power reception coil 21 provided in the communication device 20 constituting the non-contact power-supply system 1 of the first embodiment, the power reception coil 41 is a power reception unit configured to receive power transmitted from the power transmission device 10 and supply the received power to the power reception processing unit 24. Also, similar to the NFC coil 22 provided in the communication device 20 constituting the non-contact power-supply system 1 of the first embodiment, the power reception coil 41 receives necessary power in a case that NFC communication is performed transmitted from the NFC communication device (not illustrated) and supplies the received power to the NFC circuit 26 via the switch 28. Also, similar to the NFC coil 22 provided in the communication device 20 constituting the non-contact power-supply system 1 of the first embodiment, the power reception coil 41 is used as an antenna in a case that the NFC circuit 26 performs NFC communication. That is, the power reception coil 41 is a coil having functions of both the power reception coil 21 and the NFC coil 22 provided in the communication device 20 constituting the non-contact power-supply system 1 of the first embodiment. Because a power reception method and an antenna function in the power reception coil 41 are similar to those of the power reception coil 21 and the NFC coil 22 provided in the communication device 20 constituting the non-contact power-supply system 1 of the first embodiment, detailed description thereof will be omitted.

Each of the communication unit 23, the power reception processing unit 24, the charging control unit 25, and the secondary cell 27 is a corresponding component provided in the communication device 20 constituting the non-contact power-supply system 1 of the first embodiment. Accordingly, detailed description of each of the communication unit 23, the power reception processing unit 24, the charging control unit 25, and the secondary cell 27 will be omitted.

The NFC circuit 26 is an NFC circuit 26 provided in the communication device 20 constituting the non-contact power-supply system 1 of the first embodiment. However, as described above, the non-contact power-supply system 2 of the second embodiment is a non-contact power-supply system configured to receive received power transmitted through wireless power transmission from the power transmission device 10 and necessary power in a case that the NFC communication are performed transmitted through wireless power transmission from the NFC communication device 30 through the same power reception coil. Thus, the NFC circuit 26 provided in the communication device 40 constituting the non-contact power-supply system 2 of the second embodiment operates using power received by the power reception coil 41 and supplied via the switch 28 and performs signal processing in NFC communication. In other words, the NFC circuit 26 provided in the communication device 40 constituting the non-contact power-supply system 2 of the second embodiment is similar to the NFC circuit 26 provided in the communication device 20 constituting the non-contact power-supply system 1 of the first embodiment, except for a difference in a coil configured to supply power to the NFC circuit 26. Accordingly, detailed description of the NFC circuit 26 will be omitted.

The switch 28 is a switch 28 provided in the communication device 20 constituting the non-contact power-supply system 1 of the first embodiment. However, the switch 28 provided in the communication device 40 constituting the non-contact power-supply system 2 of the second embodiment is configured to switch an electrical connection between the power reception coil 41 and the NFC circuit 26 in accordance with control from the charging control unit 25. More specifically, the switch 28 is controlled in the OFF state by the charging control unit 25 if the communication device 40 charges the secondary cell 27 with the power transmitted from the power transmission device 10 and therefore an electrical connection between the power reception coil 41 and the NFC circuit 26 is blocked and a risk of destruction due to a rapid increase in a voltage of the NFC circuit 26 due to strong power can be avoided even if the power reception coil 41 receives strong power for charging the secondary cell 27. Also, if the communication device 40 performs NFC communication with the NFC communication device (not illustrated), the switch 28 is controlled in the ON state by the charging control unit 25 and therefore the power reception coil 41 and the NFC circuit 26 are electrically connected and the NFC circuit 26 operates using power received and supplied by the power reception coil 41. If the power reception coil 41 is used as an antenna in a case that NFC communication is performed, the NFC circuit 26 can perform signal processing on various information and data and the like in the NFC communication input from the power reception coil 41.

Figure 5:
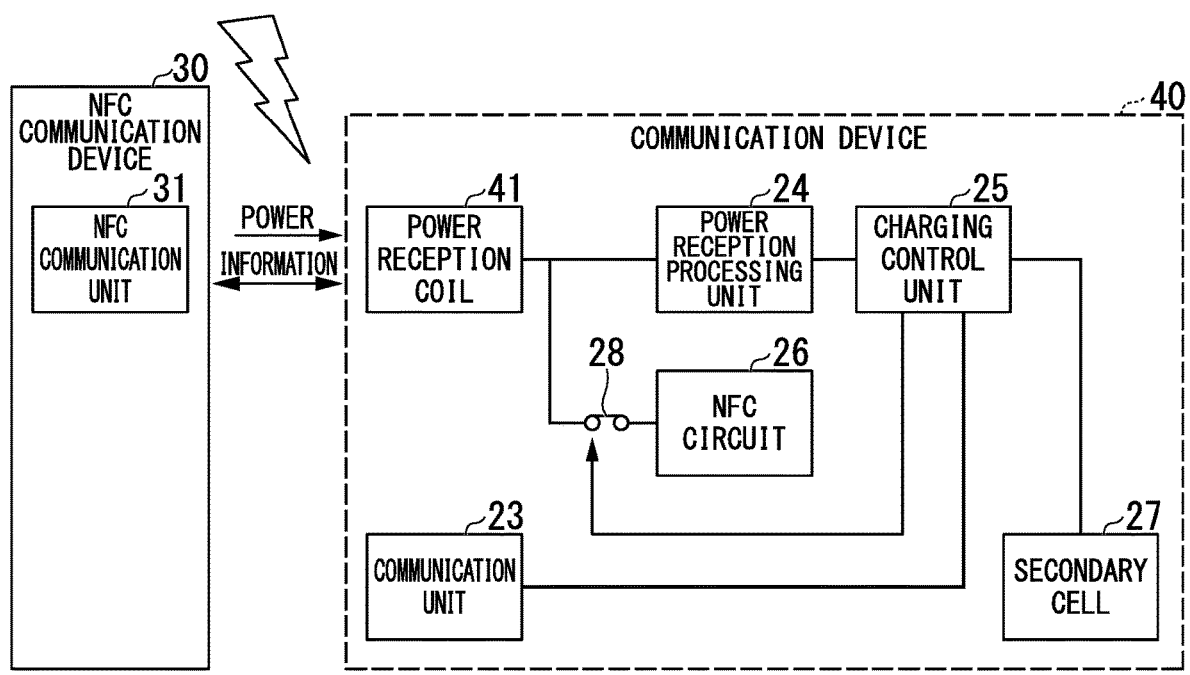
FIG. 5 is a block diagram illustrating a schematic configuration in short-range wireless communication in a communication device constituting the non-contact power-supply system according to the second embodiment of the present invention.

Here, NFC communication in the communication device 40 will be described. FIG. 5 is a block diagram illustrating a schematic configuration in short-range wireless communication (NFC communication) in the communication device 40 constituting the non-contact power-supply system 2 according to the second embodiment of the present invention. In FIG. 5, a state in which the communication device 40 constituting the non-contact power-supply system 2 is performing short-range wireless communication (NFC communication) with the NFC communication device 30 is illustrated. However, as described above, the communication device 40 uses the power reception coil 41 as an antenna in a case that NFC communication is performed.

The NFC communication device 30 is an NFC communication device 30 configured to perform NFC communication with the communication device 20 constituting the non-contact power-supply system 1 of the first embodiment. Accordingly, detailed description of the NFC communication device 30 will be omitted.

As in a case in a case that NFC communication with the communication device 20 constituting the non-contact power-supply system 1 of the first embodiment is performed, the NFC communication device 30 transmits necessary power in a case that the NFC communication is performed in a non-contact (wireless) manner (wireless power transmission) and transmits and receives various information and data in the NFC communication. As described above, the NFC circuit 26 provided in the communication device 40 performs wireless communication with the NFC communication device 30 by using the power transmitted from the NFC communication device 30 and received by the power reception coil 41. Thus, as illustrated in FIG. 5, the charging control unit 25 controls the switch 28 in the OFF state. Thereby, the power received by the power reception coil 41 and various information and data in the NFC communication are delivered from the power reception coil 41 to the NFC circuit 26 via the switch 28.

In a case that the communication device 40 approaches, the NFC communication device 30 causes a magnetic field to be formed through an NFC power transmission coil (not illustrated) and transmits power as electromagnetic waves to the communication device 40 existing in the magnetic field generated by the NFC power transmission coil (not illustrated). Thereby, in the communication device 40, the power reception coil 41 performs power reception of an induced current according to electromagnetic induction due to the magnetic field formed by the NFC communication device 30 as power transmitted by the NFC communication device 30 and supplies the received power to the NFC circuit 26 via switch 28. Thereby, the NFC circuit 26 can operate using power supplied from the power reception coil 41 via the switch 28. Then, the NFC communication device 30 performs NFC communication with the NFC circuit 26 provided in the communication device 40.

In this manner, the NFC communication device 30 transmits power to the approaching communication device 40 and performs NFC communication with the NFC circuit 26 operating with the transmitted power.

Also, in an aspect of the present invention, a configuration and a control method in which the NFC communication device 30 (i.e., the NFC communication unit 31) performs NFC communication with the communication device 40 (i.e., the NFC circuit 26), a format or a communication method of information, data, or the like to be transmitted and received in the NFC communication, and signal processing are not particularly specified.

Next, a charging process in a case that the secondary cell 27 is charged with power transmitted from the power transmission device 10 in the non-contact power-supply system 2 of the second embodiment will be described. The charging process in the non-contact power-supply system 2 of the second embodiment is similar to the charging process in the non-contact power-supply system 1 of the first embodiment illustrated in FIG. 3. Thus, detailed description of the charging process in the non-contact power-supply system 2 of the second embodiment will be omitted.

According to such a configuration and process, also in the non-contact power-supply system 2 of the second embodiment, as in the non-contact power-supply system 1 of the first embodiment, the power transmission device 10 transmits power transmission information to a communication device 40 existing outside the wireless power transmission range according to a communication standard in which an arrival distance of a radio signal (a communication distance) is longer than the wireless power transmission range (e.g., BLE communication). Thereby, also in the non-contact power-supply system 2 of the second embodiment, as in the non-contact power-supply system 1 of the first embodiment, even in a case that the power transmission device 10 has already generated strong power for charging the secondary cell 27, the communication device 40 (more specifically, the charging control unit 25) can check whether or not the power transmission device 10 is generating strong power in advance based on the received power transmission information. Thereby, also in the non-contact power-supply system 2 of the second embodiment, as in the non-contact power-supply system 1 of the first embodiment, the charging control unit 25 can perform control in a state in which it is possible to avoid a risk of destruction of the NFC circuit 26 (the OFF state of the switch 28) based on a checking result in advance before the communication device 40 enters the wireless power transmission range of the power transmission device 10.

Also, in the non-contact power-supply system 1 of the first embodiment (as in the non-contact power-supply system 2 of the second embodiment), a configuration in which the charging control unit 25 controls the switch 28 in the ON state in which the NFC circuit 26 can perform NFC communication after the communication device 20 exits the wireless power transmission range of the power transmission device 10 in a state in which charging information transmitted by another communication device or a power reception device is not received, i.e., a state in which another communication device or a power reception device does not perform a charging process has been described. However, the present invention is not limited to a configuration in which control in a case that a state in which the NFC circuit 26 can perform the NFC communication is reached is performed based on a result of checking whether or not charging information transmitted by another communication device or a power reception device has been received. For example, a configuration in which control is performed in the state in which the NFC circuit 26 can perform NFC communication after checking a magnitude (a power level) of power transmitted by the power transmission device 10 can be adopted. More specifically, the charging control unit 25 can be configured to control the switch 28 in the OFF state in which it is possible to avoid a risk of destruction of the NFC circuit 26 if the power level of power being transmitted by the power transmission device 10 is greater than or equal to a predetermined power level and control the switch 28 in the ON state in which the NFC circuit 26 can perform NFC communication if the power level of power being transmitted by the power transmission device 10 is less than or equal to the predetermined power level. Also, a method of checking a magnitude (a power level) of power being transmitted by the power transmission device 10 may be a method in which the charging control unit 25 checks the magnitude of power (the power level) based on power transmission information received by the communication unit 23, but may be a method of checking an actual magnitude (power level) of power received by the power reception coil 41. In the method in which the charging control unit 25 checks the actual magnitude (power level) of power received by the power reception coil 41, it is possible to avoid a risk of destruction of the NFC circuit 26 even if the communication unit 23 has not received power transmission information.

Third Embodiment

Next, a non-contact power-supply system of the third embodiment will be described. A schematic configuration of the non-contact power-supply system of the third embodiment is similar to that of the non-contact power-supply system 1 of the first embodiment illustrated in FIG. 1 or the non-contact power-supply system 2 of the second embodiment illustrated in FIG. 4.

Accordingly, detailed description of the schematic configuration of the non-contact power-supply system of the third embodiment will be omitted. In the following description, the configuration of the non-contact power-supply system of the third embodiment is assumed to be the schematic configuration of the non-contact power-supply system 1 of the first embodiment illustrated in FIG. 1 and a charging process in the non-contact power-supply system according to the third embodiment (hereinafter referred to as a "second charging process") will be described using the same reference signs.

Figure 6:
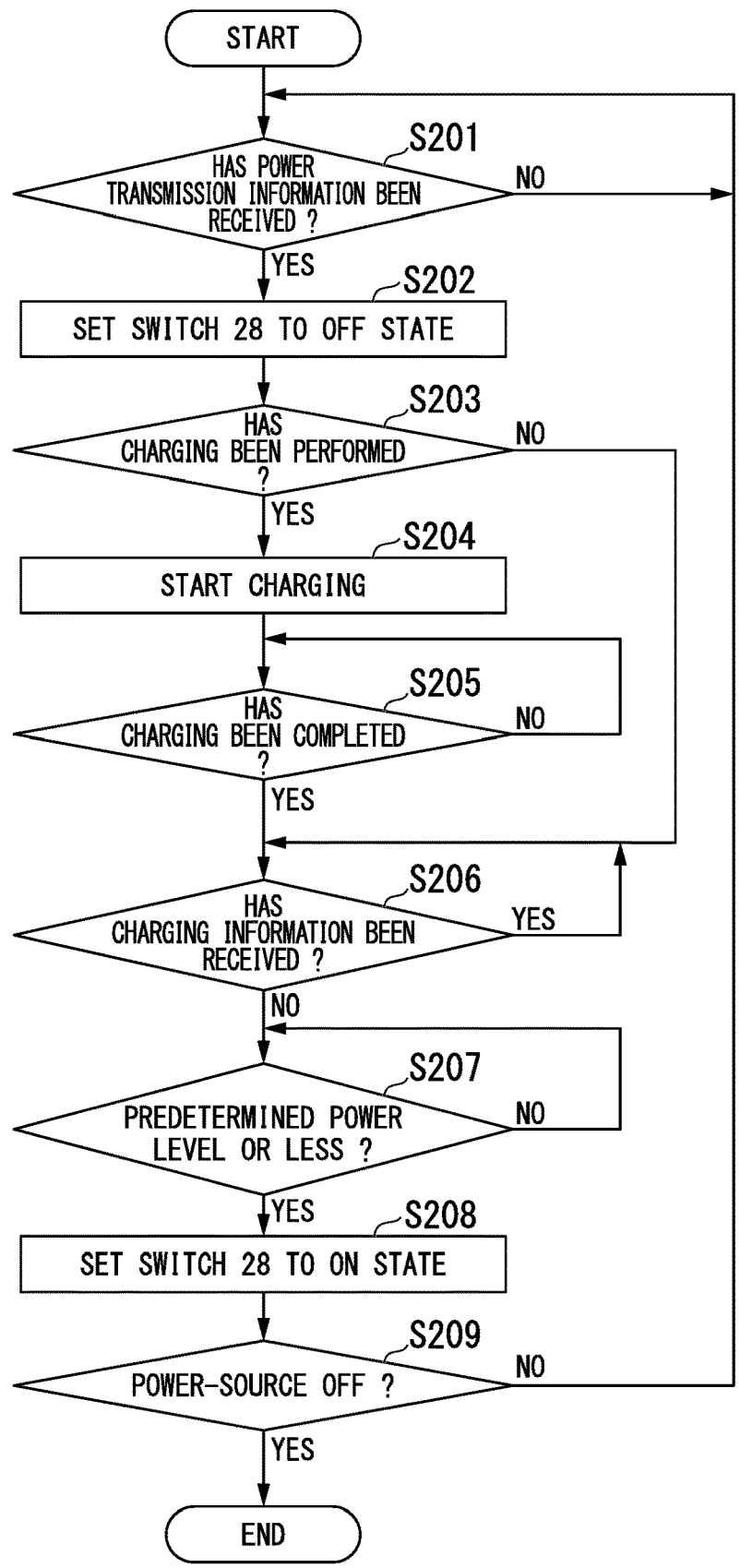
FIG. 6 is a flowchart illustrating a processing procedure in a case that a charging process is performed in a non-contact power-supply system according to a third embodiment of the present invention.

FIG. 6 is a flowchart illustrating a processing procedure in a case that a process of charging in the non-contact power-supply system 1 according to the third embodiment of the present invention (the second charging process) is performed. In the following description, as in the charging process in the non-contact power-supply system 1 of the first embodiment illustrated in FIG. 3, an example in which the communication unit 11 provided in the power transmission device 10 and the communication unit 23 provided in the communication device 20 perform short-range wireless communication based on an IEEE 802.15.1 Version 4.0 (BLE: Bluetooth (registered trademark) Low Energy) standard (hereinafter referred to as "BLE communication") will be described. Also, in the following description, as in the charging process in the non-contact power-supply system 1 of the first embodiment illustrated in FIG. 3, the an example in which the communication unit 11 provided in the power transmission device 10 periodically transmits power transmission information in a broadcast communication scheme of periodically continuously transmitting information will be described.

In a case that the communication device 20 is activated and an operation of charging the secondary cell 27 is not being performed, the charging control unit 25 controls the switch 28 in the ON state as in the non-contact power-supply system 1 of the first embodiment. Thereafter, the charging control unit 25 starts the second charging process. In the second charging process, as in the charging process in the non-contact power-supply system 1 of the first embodiment, the charging control unit 25 first controls the communication unit 23 to check whether or not the power transmission information transmitted by the power transmission device 10 through the BLE communication has been received (step S201).

If a checking result of step S201 indicates that the communication unit 23 has not received the power transmission information transmitted by the power transmission device 10 ("NO" in step S201), the charging control unit 25 maintains the ON state of the switch 28 and returns to step S201 to iterate the checking of whether or not the power transmission information transmitted by the power transmission device 10 has been received in step S201 as in the charging process in the non-contact power-supply system 1 of the first embodiment.

On the other hand, if a checking result of step S201 indicates that the communication unit 23 has received the power transmission information transmitted by the power transmission device 10 ("YES" in step S201), the charging control unit 25 controls the switch 28 in the OFF state as in the charging process in the non-contact power-supply system 1 of the first embodiment (step S202). Thereby, it is possible to avoid a risk of destruction of the NFC circuit 26 even if the NFC coil 22 temporarily receives strong power in the communication device 20 as in the charging process in the non-contact power-supply system 1 of the first embodiment.

Subsequently, as in the charging process in the non-contact power-supply system 1 of the first embodiment, the charging control unit 25 determines whether or not to perform charging of the secondary cell 27 (step S203). If it is determined that charging of the secondary cell 27 is not performed as a determination result of step S203 ("NO" in step S203), the charging control unit 25 proceeds to step S206 as in the charging process in the non-contact power-supply system 1 of the first embodiment.

On the other hand, if it is determined that charging of the secondary cell 27 is performed as a determination result of step S203 ("YES" in step S203), the charging control unit 25 starts the charging of the secondary cell 27 as in the charging process in the non-contact power-supply system 1 of the first embodiment (step S204).

At this time, as in the charging process in the non-contact power-supply system 1 of the first embodiment, the charging control unit 25 controls the communication unit 23 to transmit charging information indicating that the charging is in progress to the power transmission device 10 through BLE communication. Thereby, as in the charging process in the non-contact power-supply system 1 of the first embodiment, the charging control unit 25 provides a notification indicating that the communication device 20 in which the secondary cell 27 is being charged is present to the power transmission device 10 and another communication device or a power reception device present in the wireless power transmission range of the power transmission device 10.

Subsequently, as in the charging process in the non-contact power-supply system 1 of the first embodiment, the charging control unit 25 determines whether or not charging of the secondary cell 27 has been completed (step S205). If it is determined that the charging of the secondary cell 27 has not been completed as a determination result of step S205 ("NO" in step S205), the charging control unit 25 maintains the OFF state of the switch 28, and returns to step S205 to iterate a determination of whether or not the charging of the secondary cell 27 has been completed in step S205 as in the charging process in the non-contact power-supply system 1 of the first embodiment.

On the other hand, if it is determined that the charging of the secondary cell 27 has been completed as a determination result of step S205 ("YES" in step S205), the charging control unit 25 ends the charging of the secondary cell 27 as in the charging process in the non-contact power-supply system 1 of the first embodiment. After the charging of the secondary cell 27 ends or if it is determined that charging of the secondary cell 27 is not performed as a determination result of step S203 ("NO" in step S203), the charging control unit 25 control the communication unit 23 to check whether or not the charging information transmitted to the power transmission device 10 through the BLE communication by another communication device or a power reception device has been received as in the charging process in the non-contact power-supply system 1 of the first embodiment (step S206).

If a checking result of step S206 indicates that the communication unit 23 has received the charging information transmitted by another communication device or the power reception device ("YES" in step S206), the charging control unit 25 maintains the OFF state of the switch 28 and returns to step S206 to iterate the checking of whether or not the charging information transmitted by another communication device or a power reception device has been received in step S206 as in the charging process in the non-contact power-supply system 1 of the first embodiment.

On the other hand, if a checking result of step S206 indicates that the communication unit 23 has not received the charging information transmitted by another communication device or a power reception device ("NO" in step S206), the charging control unit 25 checks whether or not a power level at which the power transmission device 10 is transmitting power is less than or equal to a predetermined power level (step S207). In checking of whether or not the power level transmitted by the power transmission device 10 is less than or equal to the predetermined power level in step S207, for example, the charging control unit 25 checks whether or not the power level of power supplied from the power reception processing unit 24 is less than or equal to the predetermined power level. Here, the predetermined power level is a power level at which it can be determined that there is no risk of destruction of the NFC circuit 26. That is, in step S207, the charging control unit 25 checks whether or not the power level of the power transmission performed by the power transmission device 10 is a power level at which there is no risk of destruction of the NFC circuit 26.

Also, if the power transmission device 10 includes information indicating the power level of power transmission (including a voltage value, a current value, and the like) in power transmission information and transmits the power transmission information, the charging control unit 25 may check whether the power level of the power transmission performed by the power transmission device 10 is less than or equal to the predetermined power level based on the power transmission information received by the communication unit 23 in step S207.

If a checking result of step S207 indicates that the power level of the power transmission performed by the power transmission device 10 is not less than or equal to the predetermined power level ("NO" in step S207), the charging control unit 25 maintains the OFF state of the switch 28 and returns to step S207 to iterate the checking of whether or not the power level of the power transmission performed by the power transmission device 10 is less than or equal to the predetermined power level in step S207. At this time, the charging control unit 25 may request the power transmission device 10 to stop power transmission.

On the other hand, if a checking result of step S207 indicates that the power level being transmitted by the power transmission device 10 is less than or equal to the predetermined power level ("YES" in step S207), the charging control unit 25 controls the switch 28 in the ON state (step S208). Thereby, a state in which NFC communication by the NFC coil 22 and the NFC circuit 26 can be performed is reached in the communication device 20. That is, as in the charging process in the non-contact power-supply system 1 of the first embodiment, without waiting for the communication device 20 to exit the wireless power transmission range of the power transmission device 10, the charging control unit 25 can control the switch 28 in a state in which NFC communication by the NFC coil 22 and the NFC circuit 26 can be performed while avoiding a risk of destruction of the NFC circuit 26.

Subsequently, the charging control unit 25 determines whether or not to stop the operation of the communication device 20 (to turn off the power source of the communication device 20) as in the charging process in the non-contact power-supply system 1 of the first embodiment (step S209).

If it is determined that the power source of the communication device 20 is not to be turned off as a determination result of step S209 ("NO" in step S209), the charging control unit 25 returns to step S201 to iterate the second charging process as in the charging process in the non-contact power-supply system 1 of the first embodiment.

On the other hand, if it is determined that the power source of the communication device 20 is turned off as a determination result of step S209 ("YES" in step S209), the charging control unit 25 stops the operation of the communication device 20 to terminate the second charging process as in the charging process in the non-contact power-supply system 1 of the first embodiment.

According to such a configuration and process, also in the non-contact power-supply system 1 of the third embodiment, as in the non-contact power-supply system 1 of the first embodiment and the non-contact power-supply system 2 of the second embodiment, the power transmission device 10 transmits power transmission information to a communication device 20 existing outside the wireless power transmission range according to a communication standard in which an arrival distance of a radio signal (a communication distance) is longer than the wireless power transmission range (e.g., BLE communication). Thereby, also in the non-contact power-supply system 1 of the third embodiment, as in the non-contact power-supply system 1 of the first embodiment and the non-contact power-supply system 2 of the second embodiment, even in a case that the power transmission device 10 has already generated strong power for charging the secondary cell 27, the communication device 20 (more specifically, the charging control unit 25) can check whether or not the power transmission device 10 is generating strong power in advance based on the received power transmission information. Thereby, also in the non-contact power-supply system 1 of the third embodiment, as in the non-contact power-supply system 1 of the first embodiment and the non-contact power-supply system 2 of the second embodiment, the charging control unit 25 can perform control in a state in which it is possible to avoid a risk of destruction of the NFC circuit 26 (the OFF state of the switch 28) based on a checking result in advance before the communication device 20 enters the wireless power transmission range of the power transmission device 10.

Moreover, in the non-contact power-supply system 1 of the third embodiment, it is determined whether or not the power level of the power transmission performed by the power transmission device 10 is less than or equal to the predetermined power level (a power level at which it is determined that there is no risk of destruction of the NFC circuit 26) according to the second charging process (more specifically, the processing of step S207 illustrated in FIG. 6). Thus, in the non-contact power-supply system 1 of the third embodiment, as in the charging process in the non-contact power-supply system 1 of the first embodiment, without waiting for the communication device 20 to exit the wireless power transmission range of the power transmission device 10, the charging control unit 25 can control the switch 28 more quickly in a state in which NFC communication by the NFC coil 22 and the NFC circuit 26 can be performed while avoiding the risk of destruction of the NFC circuit 26.

Fourth Embodiment

Figure 7:
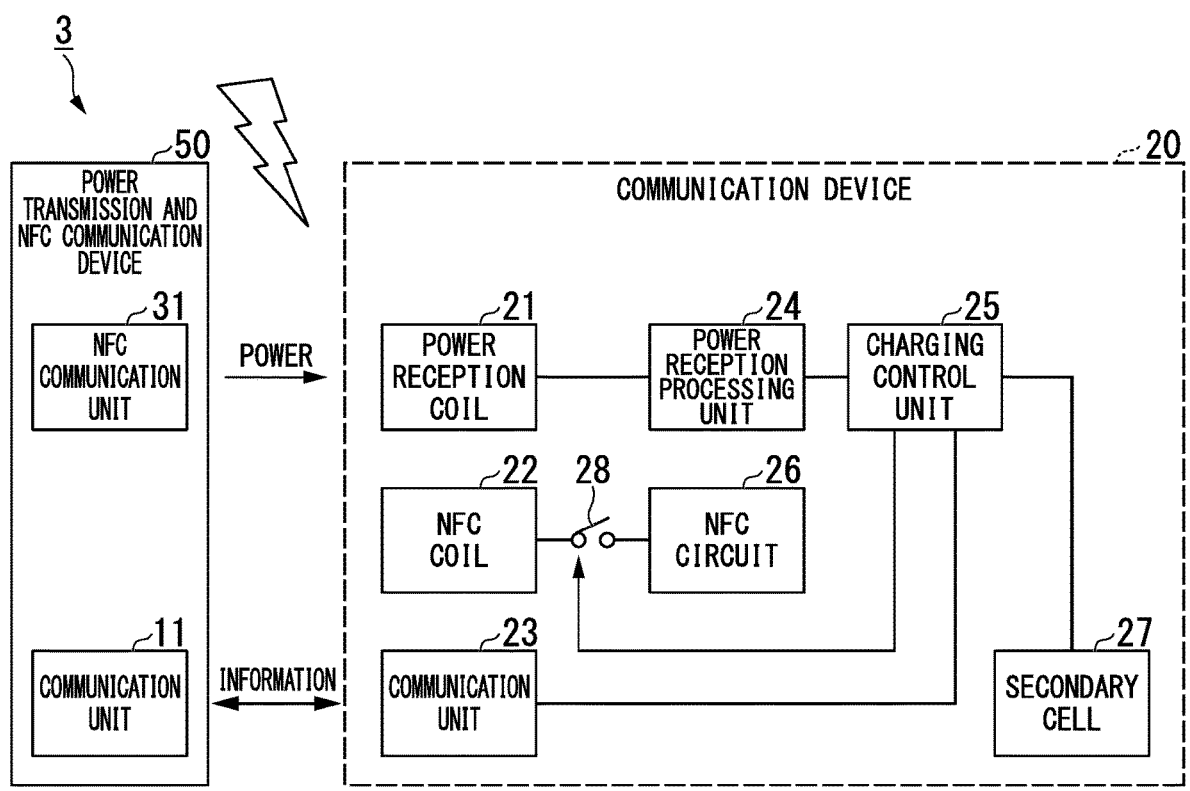
FIG. 7 is a block diagram illustrating a schematic configuration of a non-contact power-supply system according to a fourth embodiment of the present invention.

Hereinafter, a fourth embodiment of the present invention will be described with reference to the drawings. FIG. 7 is a block diagram illustrating a schematic configuration of a non-contact power-supply system according to the fourth embodiment of the present invention. A non-contact power-supply system 3 of the fourth embodiment illustrated in FIG. 7 is configured to include a power transmission and NFC communication device 50 and a communication device 20. In the non-contact power-supply system 3 of the fourth embodiment illustrated in FIG. 7, the power transmission device 10 constituting the non-contact power-supply system 1 of the first embodiment illustrated in FIG. 1 is replaced with the power transmission and NFC communication device 50.

In FIG. 7, a state in which power transmitted from the power transmission and NFC communication device 50 constituting the non-contact power-supply system 3 is being received b the communication device 20 constituting the non-contact power-supply system 3 is shown. The non-contact power-supply system 3 of the fourth embodiment is a non-contact power-supply system having a configuration in which the power transmission and NFC communication device 50 performs power transmission through wireless power transmission and NFC communication. Accordingly, the communication device 20 receives power transmitted through the wireless power transmission from the power transmission and NFC communication device 50 and simultaneously performs the NFC communication with the power transmission and NFC communication device 50. Components of the non-contact power-supply system 3 of the fourth embodiment illustrated in FIG. 7 also include components similar to components of the non-contact power-supply system 1 of the first embodiment illustrated in FIG. 1 and components in a case that the communication device 20 constituting the non-contact power-supply system 1 of the first embodiment illustrated in FIG. 2 performs the NFC communication. Accordingly, components of the non-contact power-supply system 3 similar to those of the non-contact power-supply system 1 are denoted by the same reference signs and detailed description thereof will be omitted.

The communication device 20 is a communication device 20 constituting the non-contact power-supply system 1 of the first embodiment. Accordingly, detailed description of the communication device 20 and each component included in the communication device 20 will be omitted.

The power transmission and NFC communication device 50 is a wireless power transmission device configured to transmit power in a non-contact (wireless) manner (wireless power transmission). Also, the power transmission and NFC communication device 50 is a communication device configured to transmit power necessary for NFC communication (wireless power transmission) and transmit and receive various information and data in NFC communication. The power transmission and NFC communication device 50 is configured to include a communication unit 11 and an NFC communication unit 31.

The communication unit 11 is a communication unit 11 provided in the power transmission device 10 constituting the non-contact power-supply system 1 of the first embodiment illustrated in FIG. 1. Accordingly, detailed description of the communication unit 11 will be omitted.

The NFC communication unit 31 is an NFC communication unit 31 provided in the power transmission and NFC communication device 50 configured to perform NFC communication with the communication device 20 constituting the non-contact power-supply system 1 of the first embodiment illustrated in FIG. 2.

Accordingly, detailed description of the NFC communication unit 31 will be omitted.

Figure 8:
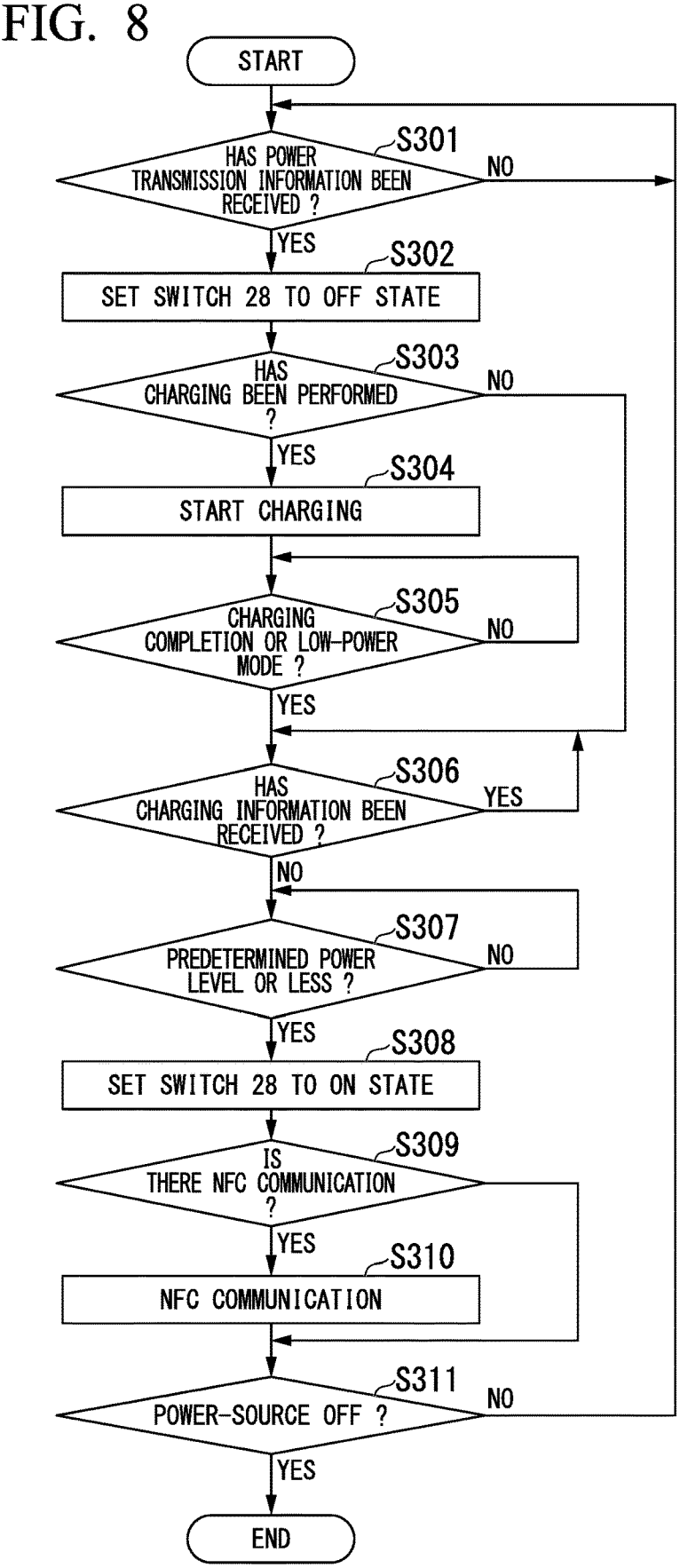
FIG. 8 is a flowchart illustrating a processing procedure in a case that a charging process is performed in the non-contact power-supply system according to the fourth embodiment of the present invention.

Next, a process in a case that the secondary cell 27 is charged with transmitted from the power transmission and NFC communication device 50 in the non-contact power-supply system 3 of the fourth embodiment (hereinafter referred to as a "third charging process") will be described. FIG. 8 is a flowchart illustrating a processing procedure in a case that a charging process is performed in the non-contact power-supply system 3 according to the fourth embodiment of the present invention (the third charging process). In the following description, as in the charging process in the non-contact power-supply system 1 of the first embodiment illustrated in FIG. 3, an example in which the communication unit 11 provided in the power transmission and NFC communication device 50 and the communication unit 23 provided in the communication device 20 perform short-range wireless communication based on an IEEE 802.15.1 version 4.0 (BLE: Bluetooth (registered trademark) Low Energy) standard (BLE communication) will be described. Also, in the following description, as in the charging process in the non-contact power-supply system 1 of the first embodiment illustrated in FIG. 3, an example in which the communication unit 11 provided in the power transmission and NFC communication device 50 periodically transmits power transmission information in a broadcast communication scheme of periodically continuously transmitting information will be described.

In a case that the communication device 20 is activated and an operation of charging the secondary cell 27 is not being performed, the charging control unit 25 controls the switch 28 in the ON state as in the non-contact power-supply system 1 of the first embodiment. Thereafter, the charging control unit 25 starts the third charging process. In the third charging process, the charging control unit 25 first controls the communication unit 23 and checks whether or not power transmission information transmitted by the power transmission and NFC communication device 50 through BLE communication has been received as in the charging process in the non-contact power-supply system 1 of the first embodiment (step S301).

If a determination result of step S301 indicates that the communication unit 23 has not received the power transmission information transmitted by the power transmission and NFC communication device 50 ("NO" in step S301), the charging control unit 25 maintains the ON state of the switch 28 and returns to step S301 to iterate the checking of whether or not the power transmission information transmitted by the power transmission and NFC communication device 50 has been received in step S301 as in the charging process in the non-contact power-supply system 1 of the first embodiment.

On the other hand, if a determination result of step S301 indicates that the communication unit 23 has received the power transmission information transmitted by the power transmission and NFC communication device 50 ("YES" in step S301), the charging control unit 25 controls the switch 28 in the OFF state as in the charging process in the non-contact power-supply system 1 of the first embodiment (step S302). Thereby, in the communication device 20, it is possible to avoid a risk of destruction of the NFC circuit 26 even if the NFC coil 22 temporarily receives strong power as in the non-contact power-supply system 1 of the first embodiment.

Subsequently, the charging control unit 25 determines whether or not to charge the secondary cell 27 as in the charging process in the non-contact power-supply system 1 of the first embodiment (step S303). If it is determined that charging of the secondary cell 27 is not performed as a determination result of step S303 ("NO" in step S303), the charging control unit 25 proceeds to step S306 as in a charging process in the non-contact power-supply system 1 of the first embodiment.

On the other hand, if it is determined that charging of the secondary cell 27 is performed as a determination result of step S303 ("YES" in step S303), the charging control unit 25 starts charging of the secondary cell 27 as in the charging process in the non-contact power-supply system 1 of the first embodiment (step S304).

At this time, as in the charging process in the non-contact power-supply system 1 of the first embodiment, the charging control unit 25 controls the communication unit 23 to transmit charging information indicating that charging is in progress to the power transmission and NFC communication device 50 through BLE communication and provides a notification indicating that the communication device 20 in which charging of the secondary cell 27 is being performed is present to the power transmission and NFC communication device 50 and another communication device or a power reception device present in a wireless power transmission range of the power transmission and NFC communication device 50.

Subsequently, the charging control unit 25 determines whether or not the charging of the secondary cell 27 has been completed or whether or not power transmission by the power transmission and NFC communication device 50 is in a low-power mode (step S305). Here, the low-power mode indicates a state in which the power level of power transmission performed by the power transmission and NFC communication device 50 is a predetermined low-power level at which it can be determined that there is no risk of destruction of the NFC circuit 26 (also including stopping of power transmission). This low-power mode can be set according to, for example, an operation of a user of the power transmission and NFC communication device 50 (that may be the communication device 20). In the low-power mode, also in a state in which charging of the secondary cell 27 has not been completed, it is possible to perform another process (e.g., NFC communication) by temporarily terminating the charging of the secondary cell 27, i.e., interrupting the charging of the secondary cell 27.

If it is determined that the charging of the secondary cell 27 has not been completed or if power transmission of the power transmission and the NFC communication device 50 is not in the low-power mode as a determination result of step S305 ("NO" in step S305), the charging control unit 25 maintains the OFF state of the switch 28 and returns to step S305 to iterate the processing of step S305 as in the charging process in the non-contact power-supply system 1 of the first embodiment. That is, the charging control unit 25 iterates the determination of whether or not charging of the secondary cell 27 has been completed or whether or not power transmission by the power transmission and NFC communication device 50 is in the low-power mode.

On the other hand, if it is determined that charging of the secondary cell 27 has been completed or if power transmission by the power transmission and NFC communication device 50 is in the low-power mode as a determination result of step S305 ("YES" in step S305), the charging control unit 25 ends the charging of the secondary cell 27 as in the charging process in the non-contact power-supply system 1 of the first embodiment. After the charging of the secondary cell 27 ends or if it is determined that charging of the secondary cell 27 is not performed as a determination result of step S303 ("NO" in step S303), the charging control unit 25 controls the communication unit 23 to check whether or not charging information transmitted to the power transmission and NFC communication device 50 by another communication device or a power reception device through the BLE communication has been received, as in the charging process in the non-contact power-supply system 1 of the first embodiment (step S306).

If a checking result of step S306 indicates that the communication unit 23 has received the charging information transmitted by another communication device or a power reception device ("YES" in step S306), the charging control unit 25 maintains the OFF state of the switch 28 and returns to step S306 to iterate the checking of whether or not charging information transmitted by another communication device or a power reception device has been received in step S306 as in the charging process in the non-contact power-supply system 1 of the first embodiment, On the other hand, if a checking result of step S306 indicates that the communication unit 23 has not received the charging information transmitted by another communication device or a power reception device ("NO" in step S306), the charging control unit 25 checks whether or not a power level of power transmission performed by the power transmission and NFC communication device 50 is less than or equal to a predetermined power level (step S307). A process of checking whether or not the power level of power transmission performed by the power transmission and NFC communication device 50 is less than or equal to the predetermined power level in step S307 is similar to the processing of step S207 of the second charging process in the non-contact power-supply system 1 of the third embodiment illustrated in FIG. 6.

If a checking result of step S307 indicates that the power level of power transmission performed by the power transmission and NFC communication device 50 is not less than or equal to the predetermined power level ("NO" in step S307), the charging control unit 25 maintains the OH state of the switch 28 and returns to step S307 to iterate the checking of whether or not the power level of power transmission performed by the power transmission and NFC communication device 50 is less than or equal to the predetermined power level in step S307. Also, at this time, as in the processing of step S207 of the second charging process in the non-contact power-supply system 1 of the third embodiment illustrated in FIG. 6, the charging control unit 25 may request the power transmission and NFC communication device 50 to stop power transmission.

On the other hand, if a checking result of step S307 indicates that the power level of power transmission performed by the power transmission and NFC communication device 50 is less than or equal to the predetermined power level ("YES" in step S307), the charging control unit 25 controls the switch 28 in the ON state (step S308). Also, if the switch 28 is already in the ON state in the processing of step S307, the charging control unit 25 maintains the current ON state of the switch 28. Thereby, a state in which it is possible to perform NFC communication with the power transmission and NFC communication device 50 by the NFC coil 22 and the NFC circuit 26 while avoiding a risk of destruction of the NFC circuit 26 is reached in the communication device 20.

Subsequently, the charging control unit 25 checks whether or not there is NFC communication with the power transmission and NFC communication device 50 (step S309). In the checking of whether or not there is NFC communication with the power transmission and NFC communication device 50 in step S309, the charging control unit 25 checks, for example, whether or not power to be used by the NFC circuit 26 to be operated is being transmitted by the NFC power transmission circuit (not illustrated) provided in the power transmission and NFC communication device 50, whether or not various information and data to be exchanged through NFC communication are being transmitted from the NFC communication unit 31, or the like. If power to be used by the NFC circuit 26 to be operated is being transmitted or if various information and data to be exchanged through NFC communication are being transmitted from the NFC communication unit 31, the charging control unit 25 determines that there is NFC communication. On the other hand, if power to be used by the NFC circuit 26 to be operated is not being transmitted or if various information and data to be exchanged through NFC communication are not being transmitted from the NFC communication unit 31, the charging control unit 25 determines that there is no NFC communication.

If it is determined that there is no NFC communication with the power transmission and NFC communication device 50 as a determination result of step S309 ("NO" in step S309), the charging control unit 25 proceeds to step S311.

On the other hand, if determining that there is NFC communication with the power transmission and NFC communication device 50 as a determination result of step S309 ("YES" in step S309), the charging control unit 25 performs NFC communication (step S310). That is, the charging control unit 25 causes the NFC circuit 26 to be operated with the transmitted power.

Subsequently, the charging control unit 25 determines whether or not to stop the operation of the communication device 20 (turn off the power source of the communication device 20) as in the charging process in the non-contact power-supply system 1 of the first embodiment (step S311).

If it is determined that the power source of the communication device 20 is not turned off as a determination result of step S311 ("NO" in step S311), the charging control unit 25 returns to step S301 to iterate the third charging process as in the charging process in the non-contact power-supply system 1 of the first embodiment. This corresponds to a case in which the charging control unit 25 starts (resumes) charging of the secondary cell 27 if the charging control unit 25 temporarily terminates (interrupts) the charging of the secondary cell 27 in accordance with a determination result of step S305.

On the other hand, if it is determined that the power source of the communication device 20 is turned off as a determination result of step S311 ("YES" in step S311), the charging control unit 25 terminates the third charging process by stopping the operation of the communication device 20 as in the charging process in the non-contact power-supply system 1 of the first embodiment.

According to such a configuration and process, also in the non-contact power-supply system 3 of the fourth embodiment, as in the non-contact power-supply system 1 of the first embodiment, the power transmission and NFC communication device 50 transmits power transmission information to a communication device 20 existing outside the wireless power transmission range according to a communication standard in which an arrival distance of a radio signal (a communication distance) is longer than the wireless power transmission range (e.g., BLE communication). Thereby, also in the non-contact power-supply system 3 of the fourth embodiment, as in the non-contact power-supply system 1 of the first embodiment, even in a case that the power transmission and NFC communication device 50 has already generated strong power for charging the secondary cell 27, the communication device 20 (more specifically, the charging control unit 25) can check whether or not the power transmission and NFC communication device 50 is generating strong power in advance based on the received power transmission information. Thereby, also in the non-contact power-supply system 3 of the fourth embodiment, as in the non-contact power-supply system 1 of the first embodiment, the charging control unit 25 can perform control in a state in which it is possible to avoid a risk of destruction of the NFC circuit 26 (the OFF state of the switch 28) based on a checking result in advance before the communication device 20 enters the wireless power transmission range of the power transmission and NFC communication device 50.

Moreover, in the non-contact power-supply system 3 of the fourth embodiment, according to the third charging process (more specifically, the processing of step S305 illustrated in FIG. 8), the charging of the secondary cell 27 is temporarily terminated (interrupted) and another process can be performed in a state in which the power level of the power transmission performed by the power transmission and NFC communication device 50 is less than or equal to the predetermined power level (a power level at which it is determined that there is no risk of destruction of the NFC circuit 26). That is, in the non-contact power-supply system 3 of the fourth embodiment, as in the charging process in the non-contact power-supply system 1 of the first embodiment, without waiting for the charging of the secondary cell 27 provided in the communication device 20 to be completed, it is possible to perform another process including NFC communication while avoiding a risk of destruction of the NFC circuit 26.

Also, in the non-contact power-supply system 3 of the fourth embodiment, a case in which a communication device configured to receive power transmitted from the power transmission and NFC communication device 50 and perform NFC communication is a communication device 20 is illustrated in FIG. 7. However, the communication device configured to receive the power transmitted from the power transmission and NFC communication device 50 and perform NFC communication is not limited to the communication device 20. For example, the communication device 40 constituting the non-contact power-supply system 2 of the second embodiment illustrated in FIGS. 4 and 5 may constitute the non-contact power-supply system 3 instead of the communication device 20 and may perform the reception of power transmitted from the power transmission and NFC communication device 50 and NFC communication.

As described above, according to a mode for carrying out the present invention, charging-related information is exchanged between a power transmission device and a communication device (which is also referred to as a power reception device) constituting a non-contact power-supply system through wireless communication based on a communication standard in which an arrival distance (a communication distance) of a radio signal is longer than a range in which the power transmission device can transmit power through wireless power transmission. Here, the charging-related information includes information indicating a situation of whether or not the power transmission device is transmitting power (power transmission information) and information indicating whether or not the communication device is charging a secondary cell (charging information). Thereby, in a mode for carrying out the present invention, in a state in which a communication device constituting a non-contact power-supply system is present outside a range in which a power transmission device can transmit power through wireless power transmission, it is possible to pre-check whether or not the power transmission device is transmitting power in advance. That is, in a mode for carrying out the present invention, it is possible to check whether or a power transmission device is transmitting power while securing a distance from the power transmission device for avoiding a risk of destruction of a short-range wireless communication circuit provided in a communication device. Thereby, in a mode for carrying out the present invention, even in a case that the power transmission device has already generated strong power for charging the secondary cell, it is possible to set a connection within a communication device of a short-range wireless communication circuit provided in a communication device in a connected state in which a risk of destruction of the short-range wireless communication circuit can be avoided before the communication device enters a range in which the power transmission device is transmitting power through wireless power transmission based on a checking result in advance. Thereby, in a mode for carrying out the present invention, in a case that a power transmission device charges a secondary cell with power transmitted through wireless power transmission, a risk of destruction of a short-range wireless communication circuit provided in a communication device can be avoided.

Also, in a mode for carrying out the present invention, a configuration in a case in which it can be said that a communication device is a power reception device has been described. However, a communication device to which a configuration and a function based on the concept of the present invention can be applied is not limited to the communication device having the configuration described in the mode for carrying out the present invention. For example, although the communication device has a function of performing short-range wireless communication, a configuration in which a power transmission device does not have a function of receiving power transmitted in a non-contact (wireless) manner (wireless power transmission) is conceived. More specifically, for example, in the communication device 20 constituting the non-contact power-supply system 1 of the first embodiment illustrated in FIG. 1, a configuration in which the power reception coil 21 and the power reception processing unit 24 or the charging control unit 25 do not have a function of controlling power supply and charging for the secondary cell 27 with power supplied from the power reception processing unit 24 is also conceived. In a communication device having such a configuration, i.e., also in a communication device having only the function of short-range wireless communication, a case in which, if the power transmission device is in a range in which power can be transmitted through wireless power transmission, an NFC coil configured to receive power for the short-range wireless communication receives strong power and supplies the received power to a short-range wireless communication circuit (applies power thereto) and therefore the short-range wireless communication circuit is destructed is conceived. Therefore, by applying a configuration and a function based on the concept of an aspect of the present invention to a communication device having only a short-range wireless communication function, also in the communication device having only the short-range wireless communication function, it is possible to obtain an effect similar to that of a communication device of the aspect of the invention. More specifically, for example, a configuration in which power received by the NFC coil 22 via the switch 28 in the communication device 20 constituting the non-contact power-supply system 1 of the first embodiment illustrated in FIG. 1 is supplied to the NFC circuit 26 and a function in which the charging control unit 25 controls opening and closing of the switch 28 (an open circuit and a short circuit) based on power transmission information received by the communication unit 23 are applied to the communication device having only the function of the short-range wireless communication. Thereby, it is possible to perform control in a state in which a risk of destruction of the short-range wireless communication circuit is avoided (an OFF state of the switch 28) before the communication device having only the short-range wireless communication function enters a range in which a power transmission device transmits power through wireless power transmission. Thereby, it is possible to obtain an effect similar to that of the communication device of an aspect of the present invention also in a communication device having only the short-range wireless communication function. That is, also in a communication device having only the short-range wireless communication function, it is possible to avoid a risk of destruction of the short-range wireless communication circuit by applying the concept of an aspect of the present invention.

Although embodiments of the present invention have been described with reference to the drawings, specific configurations are not limited to the embodiments and various modifications are also included without departing from the scope of the present invention.

INDUSTRIAL APPLICABILITY

Some aspects of the present invention can be applied to a communication device, a control program, a non-contact power-supply system, and the like required to avoid a risk of destruction of a short-range wireless communication circuit provided in a communication device in a case that a secondary cell is charged with power transmitted through wireless power transmission.

DESCRIPTION OF THE REFERENCE SYMBOLS

1 Non-contact power-supply system
10 Power transmission device
11 Communication unit (first communication unit)
20 Communication device
21 Power reception coil (power reception unit)
22 NFC coil (power reception unit, second power reception unit)
23 Communication unit (second communication unit, communication unit)
24 Power reception processing unit
25 Charging control unit (control unit)
26 NFC circuit (short-range wireless communication unit)
27 Secondary cell
28 Switch (connection blocking unit)
30 NFC communication device
31 NFC communication unit
2 Non-contact power-supply system
40 Communication device
41 Power reception coil (power reception unit, second power reception unit)
50 Power transmission and NFC communication device (power transmission device)

The invention claimed is:

1. A communication device, comprising:
a short-range wireless communication unit that performs short-range wireless communication;
a communication unit that receives power transmission information about power transmission transmitted from a power transmission device that transmits power in a non-contact manner; and
a control unit that controls whether power application to the short-range wireless communication unit is blocked or not blocked in a case that the communication unit has received the power transmission information, the control being performed based on whether or not the power transmission information indicates that the power is being transmitted or is not being transmitted.

2. The communication device according to claim 1, the communication device further comprising:
a power reception unit that receives the power transmitted from the power transmission device; and
a secondary cell,
wherein the control unit controls charging of the secondary cell with the power received by the power reception unit.

3. The communication device according to claim 1, wherein the control unit blocks the power application to the short-range wireless communication unit in a case that the power transmission information indicates that the power is being transmitted.

4. The communication device according to claim 1, wherein the control unit performs control in a state in which the power application to the short-range wireless communication unit is not blocked in a case that the power transmission information indicates that the power is not being transmitted.

5. The communication device according to claim 1, wherein the control unit performs control in a state in which the power application to the short-range wireless communication unit is not blocked in a case that a state in which the communication unit does not receive the power transmission information has been reached.

6. The communication device according to claim 1, wherein the control unit blocks the power application to the short-range wireless communication unit in a case that the communication device is present in a power transmission range in which the power transmission device is able to transmit the power.

7. The communication device according to claim 1, wherein the control unit blocks the power application to the short-range wireless communication unit in a case that a magnitude of the power transmitted by the power transmission device is greater than or equal to a predetermined magnitude.

8. The communication device according to claim 1, wherein the control unit performs control in a state in which the power application to the short-range wireless communication unit is not blocked in a case that a magnitude of the power transmitted by the power transmission device is less than or equal to a predetermined magnitude.

9. The communication device according to claim 1, the communication device further comprising:
   a connection blocking unit that blocks an electrical connection of a path along which the power is supplied to the short-range wireless communication unit,
   wherein the control unit performs control in a state in which the power application to the short-range wireless communication unit is blocked by controlling the connection blocking unit in an open state, and
   wherein the control unit performs control in a state in which the power application to the short-range wireless communication unit is not blocked by controlling the connection blocking unit in a closed state.

10. A non-transitory computer readable recording medium storing a control program for causing a computer to function as a control unit of a communication device including a short-range wireless communication unit that performs short-range wireless communication, a communication unit that receives power transmission information about power transmission transmitted from a power transmission device that transmits power in a non-contact manner, and the control unit,
   wherein the control program causes the computer to function as the control unit that controls whether power application to the short-range wireless communication unit is blocked or not blocked in a case that the communication unit has received the power transmission information, the control being performed based on whether or not the power transmission information indicates that the power is being transmitted or is not being transmitted.

11. A non-contact power-supply system, comprising:
   a power transmission device comprising a first communication unit having a communication distance that is longer than a power transmission range in which power is able to be transmitted in a non-contact manner and that transmits power transmission information about power transmission through the first communication unit; and
   a communication device including a short-range wireless communication unit that performs short-range wireless communication, a second communication unit that receives the power transmission information transmitted from the power transmission device, and a control unit that controls whether power application to the short-range wireless communication unit is blocked or not blocked in a case that the second communication unit has received the power transmission information, the control being performed based on whether or not the power transmission information indicates that the power is being transmitted or is not being transmitted.

* * * * *